(12) United States Patent
Kanai et al.

(10) Patent No.: US 12,562,375 B2
(45) Date of Patent: Feb. 24, 2026

(54) SECONDARY BATTERY, BATTERY PACK, AND VEHICLE

(71) Applicant: KABUSHIKI KAISHA TOSHIBA, Tokyo (JP)

(72) Inventors: Yuta Kanai, Yokohama (JP); Tetsuya Sasakawa, Yokohama (JP); Kazuomi Yoshima, Yokohama (JP); Tomoko Sugizaki, Kawasaki (JP); Yasunobu Yamashita, Tokyo (JP); Kazuki Ise, Kawasaki (JP); Taro Fukaya, Tokyo (JP); Norio Takami, Yokohama (JP); Yasuhiro Harada, Isehara (JP); Keigo Hoshina, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 735 days.

(21) Appl. No.: 17/822,605

(22) Filed: Aug. 26, 2022

(65) Prior Publication Data

US 2023/0197931 A1 Jun. 22, 2023

(30) Foreign Application Priority Data

Dec. 22, 2021 (JP) ................................. 2021-208411

(51) Int. Cl.
*H01M 4/36* (2006.01)
*H01M 4/48* (2010.01)
(Continued)

(52) U.S. Cl.
CPC ........... *H01M 4/364* (2013.01); *H01M 4/483* (2013.01); *H01M 10/0525* (2013.01);
(Continued)

(58) Field of Classification Search
CPC .. H01M 4/364; H01M 4/483; H01M 10/0525; H01M 10/425; H01M 2004/027;
(Continued)

(56) References Cited

U.S. PATENT DOCUMENTS

| | | | |
|---|---|---|---|
| 10,497,962 B2 * | 12/2019 | Glanz | ................... H01M 4/043 |
| 11,217,793 B2 | 1/2022 | Kanai et al. | |
| 2010/0028767 A1 | 2/2010 | Inose et al. | |

FOREIGN PATENT DOCUMENTS

| | | | | |
|---|---|---|---|---|
| CA | 3183484 A1 * | 12/2021 | ............. | C01G 33/00 |
| EP | 2421075 B1 * | 10/2016 | .......... | H01M 4/0435 |

(Continued)

OTHER PUBLICATIONS

Japanese Office Action issued May 7, 2025 in Japanese Patent Application No. 2021-208411, (with unedited computer- generated English translation), 11 pages.

*Primary Examiner* — Milton I Cano
(74) *Attorney, Agent, or Firm* — Oblon, McClelland, Maier & Neustadt, L.L.P.

(57) ABSTRACT

According to one embodiment, a secondary battery including a negative electrode. The negative electrode includes a negative electrode current collector and a negative electrode mixture layer. A thickness of the negative electrode current collector is in a range of 8 μm to 18 μm. The negative electrode current collector includes a first current collector end surface extending along a stacking direction. The negative electrode mixture layer includes a niobium-titanium composite oxide, and a first protrusion protruding from the first current collector end surface along a first direction orthogonal to the stacking direction. A protrusion length A1 of the first protrusion satisfies $0 \text{ mm} < A1 \leq 1.0 \text{ mm}$.

10 Claims, 16 Drawing Sheets

3

(51) Int. Cl.
    *H01M 10/0525*     (2010.01)
    *H01M 10/42*       (2006.01)
    *H01M 4/02*        (2006.01)

(52) U.S. Cl.
    CPC .... *H01M 10/425* (2013.01); *H01M 2004/027*
             (2013.01); *H01M 2220/20* (2013.01)

(58) Field of Classification Search
    CPC .. H01M 2220/20; H01M 4/131; H01M 4/661;
              H01M 4/366; H01M 4/463; H01M
                        4/1395; H01M 4/70
    See application file for complete search history.

(56)                     References Cited

FOREIGN PATENT DOCUMENTS

| | | | | |
|---|---|---|---|---|
| JP | 2010-34009 | A | 2/2010 | |
| JP | 2021-48005 | A | 3/2021 | |
| WO | WO 2018/020667 | A1 | 2/2018 | |
| WO | WO-2019234248 | A1 * | 12/2019 | ............ C01G 39/00 |
| WO | WO 2021/085202 | A1 | 5/2021 | |

* cited by examiner

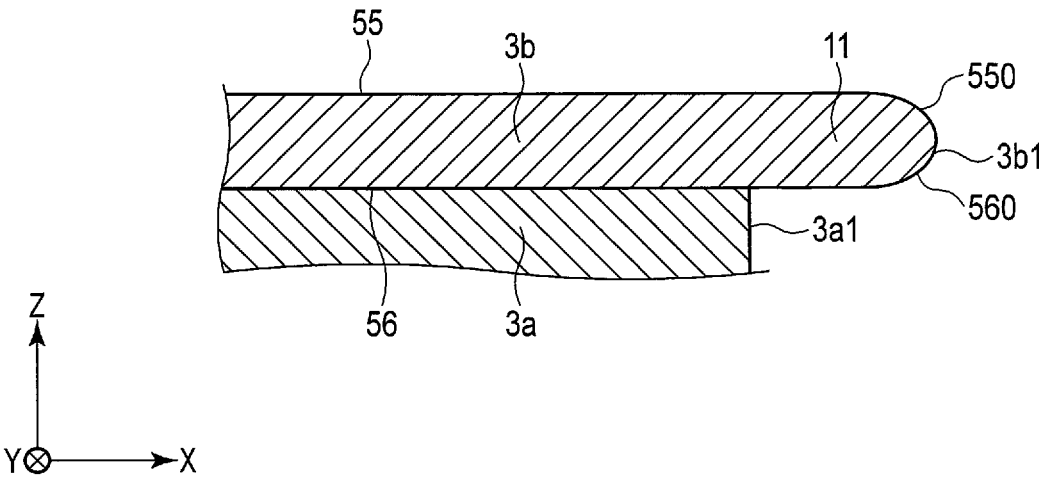
F I G. 4
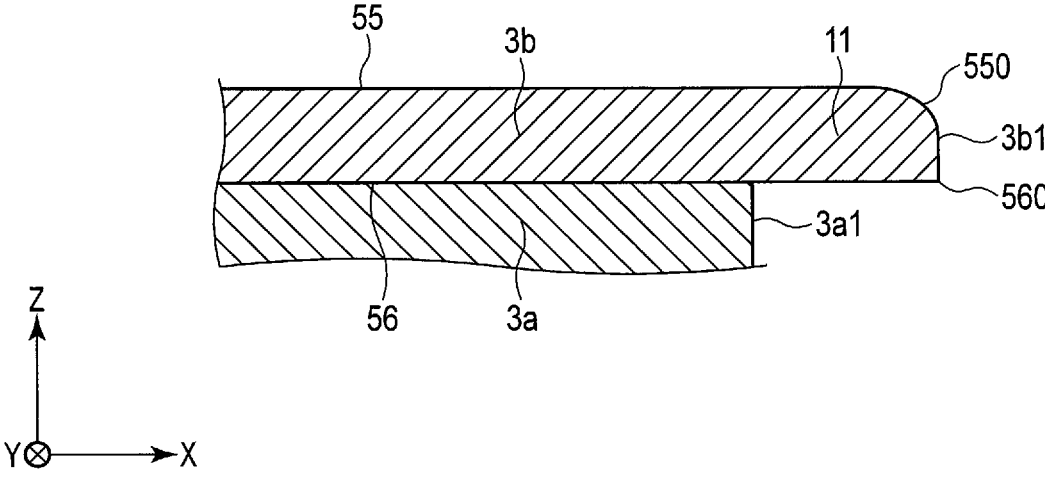
F I G. 5

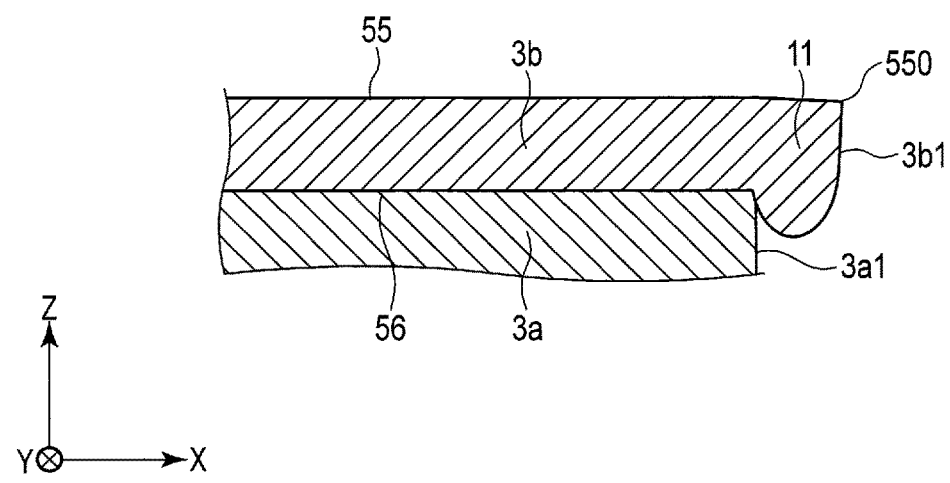
F I G. 8
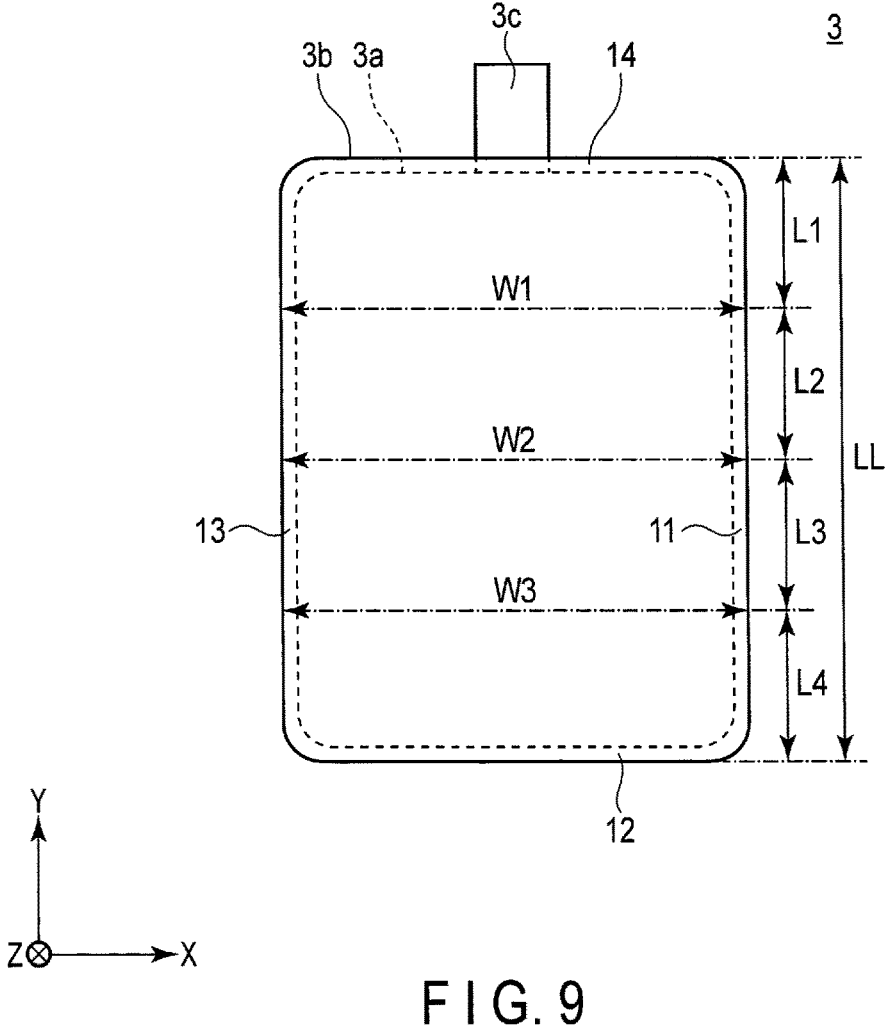
F I G. 9

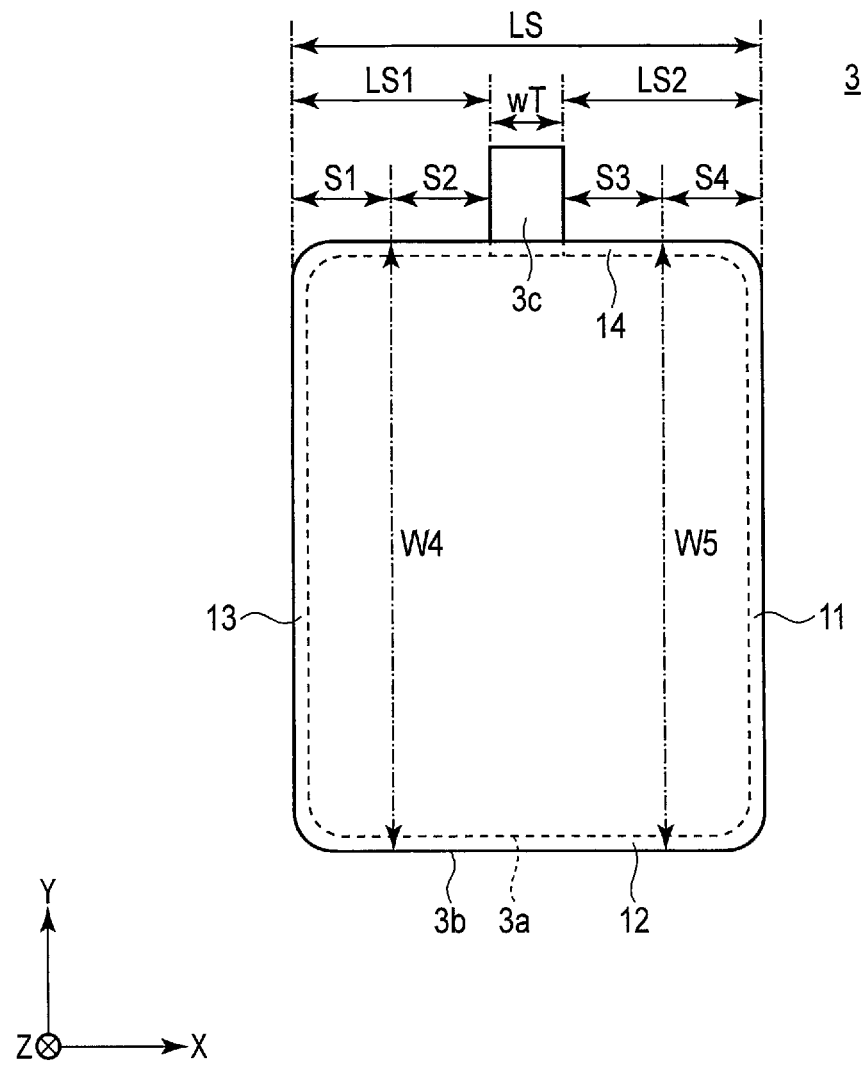
F I G. 10

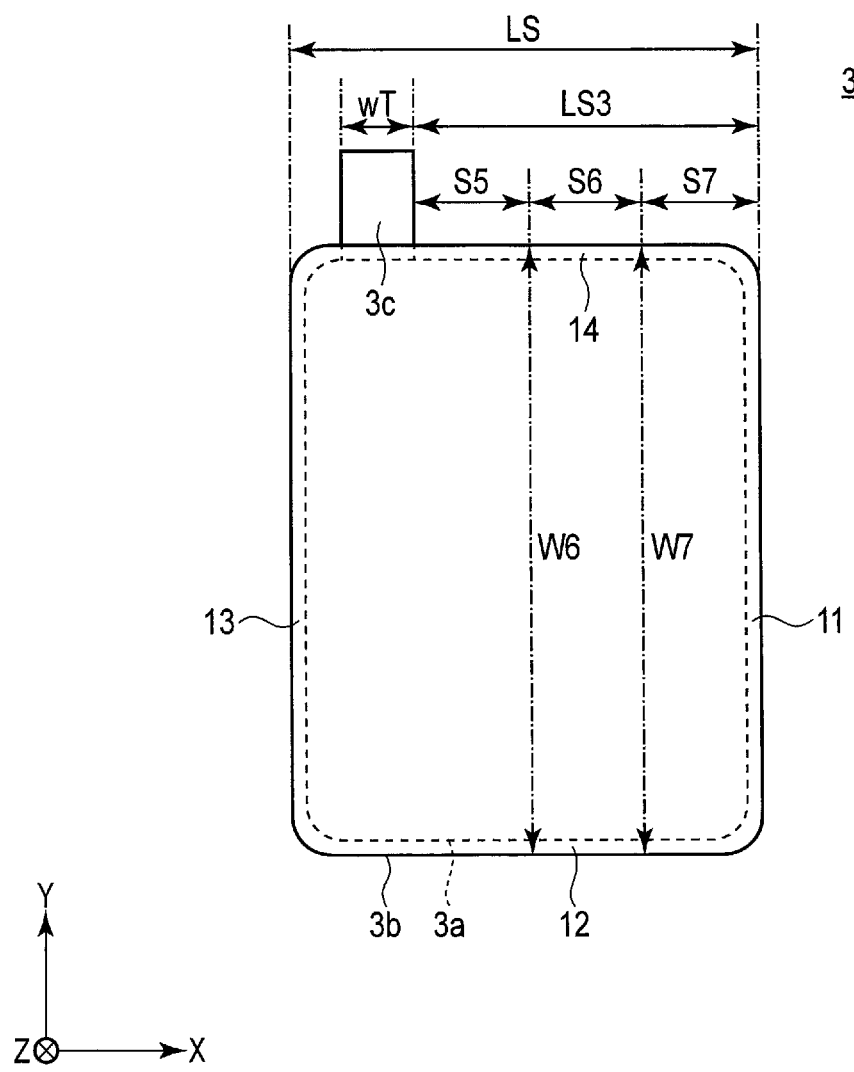
F I G. 11

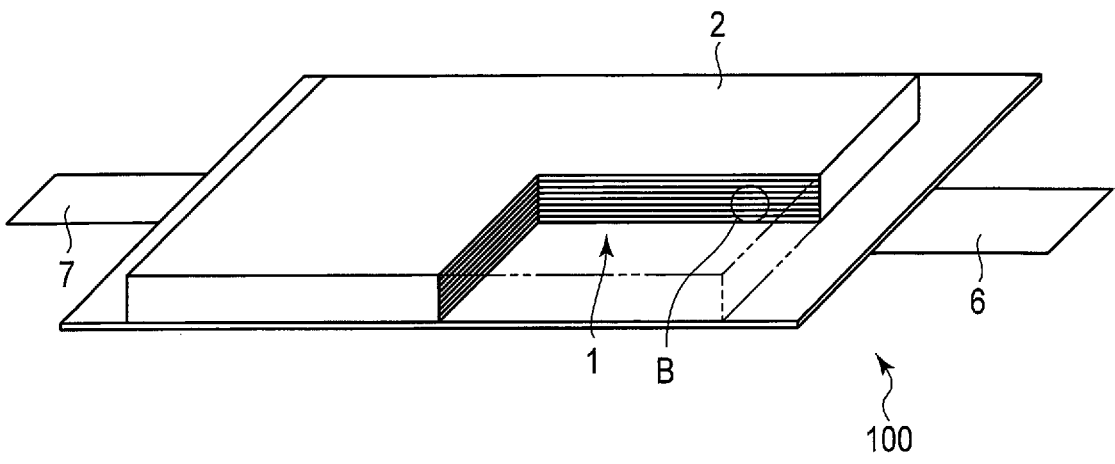
F I G. 12
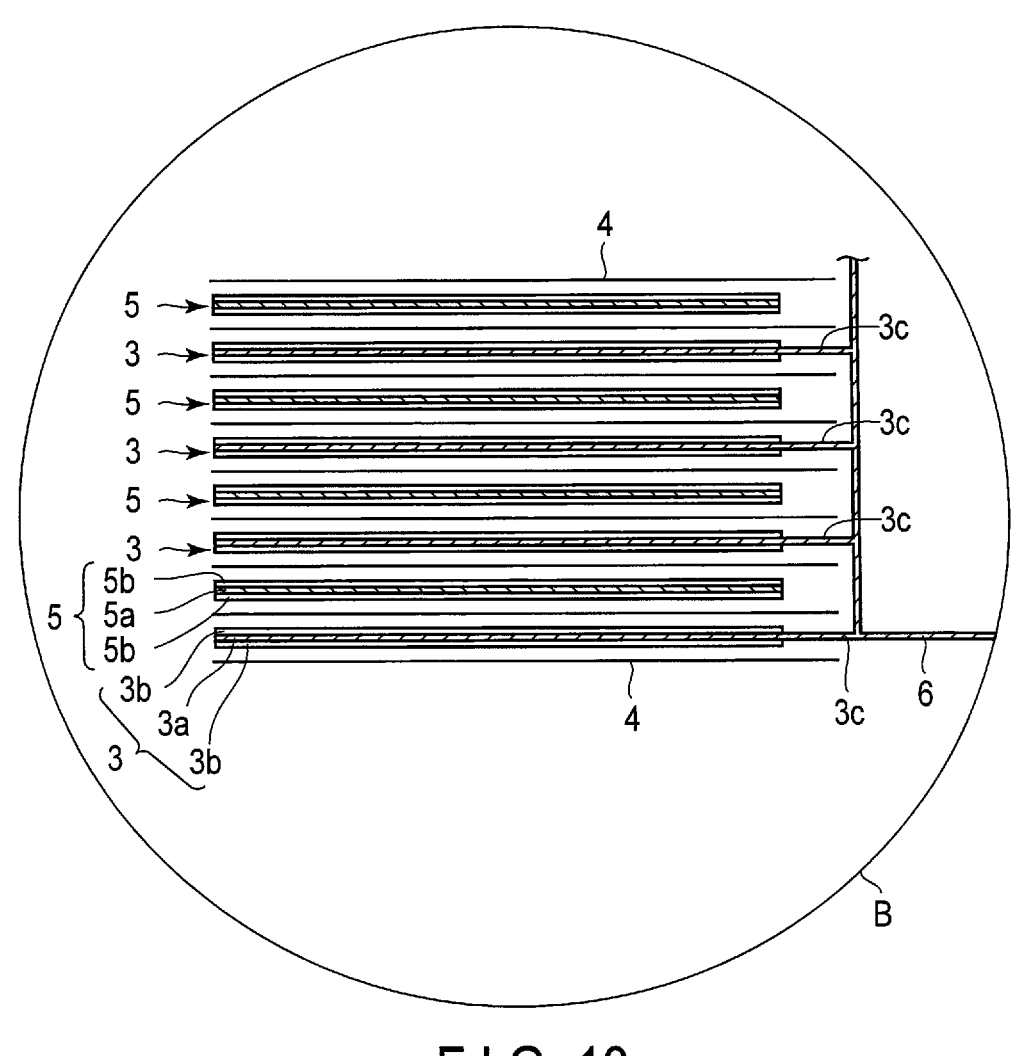
F I G. 13

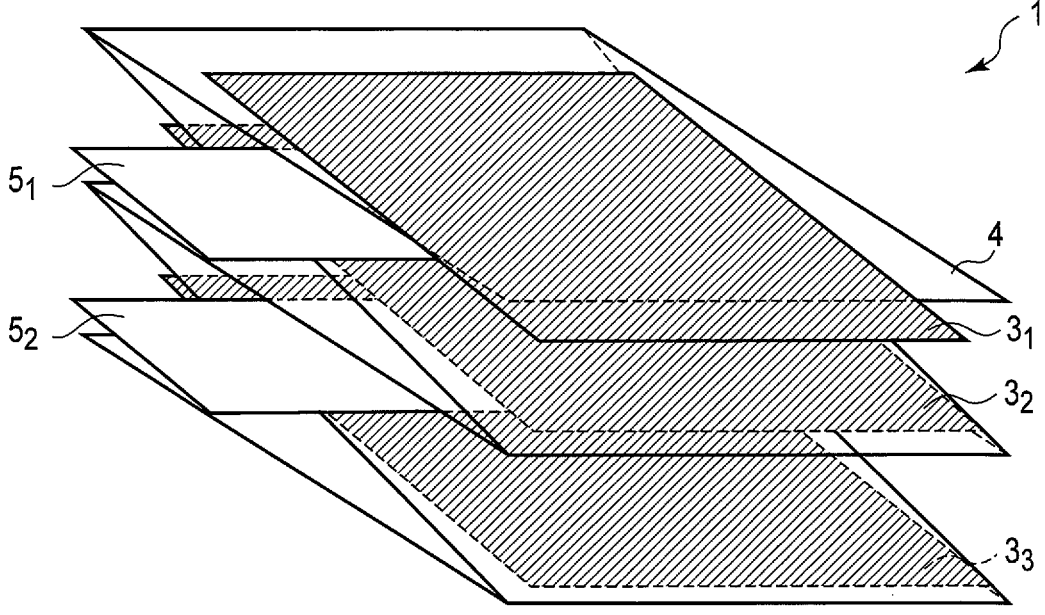
F I G. 14

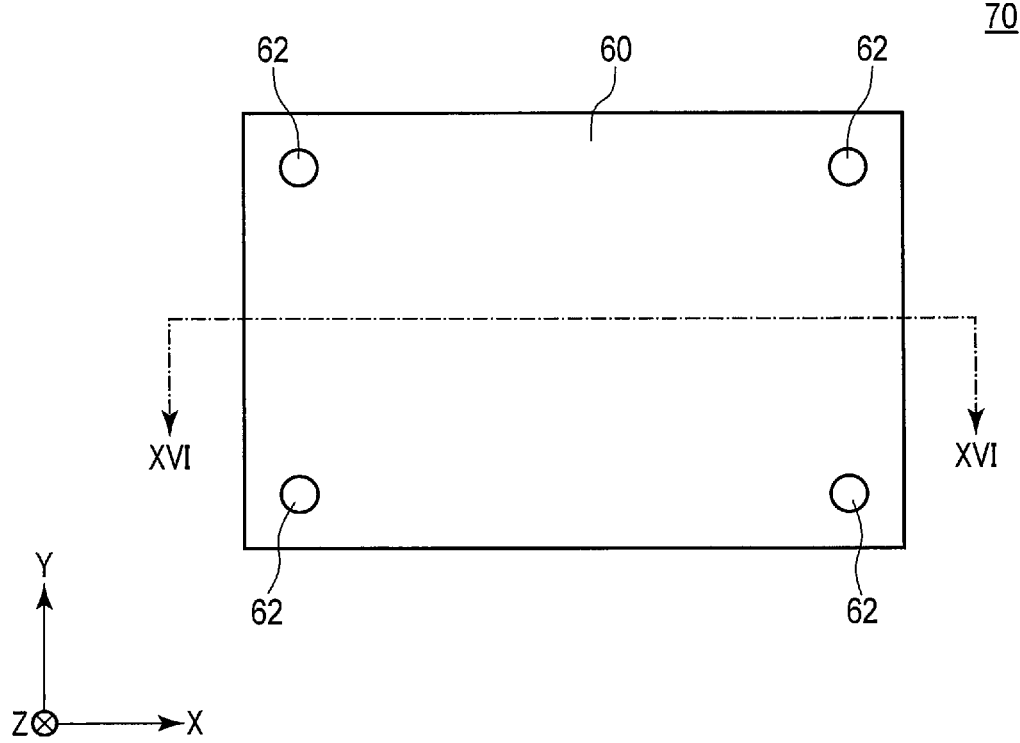
F I G. 15

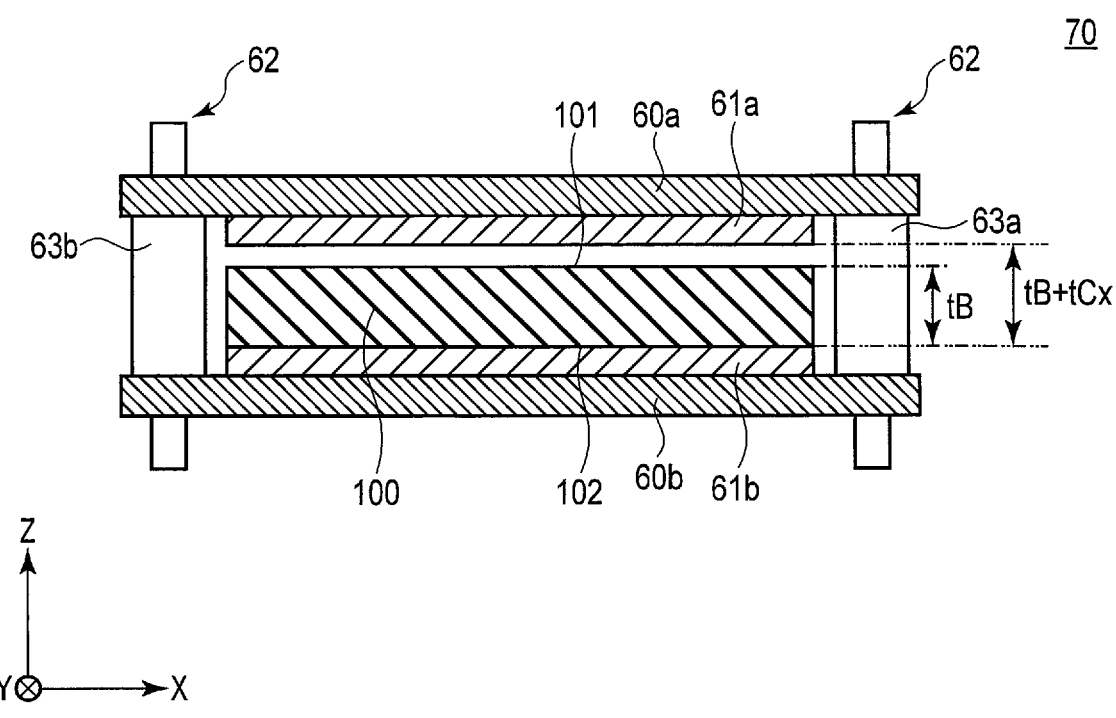
F I G. 16
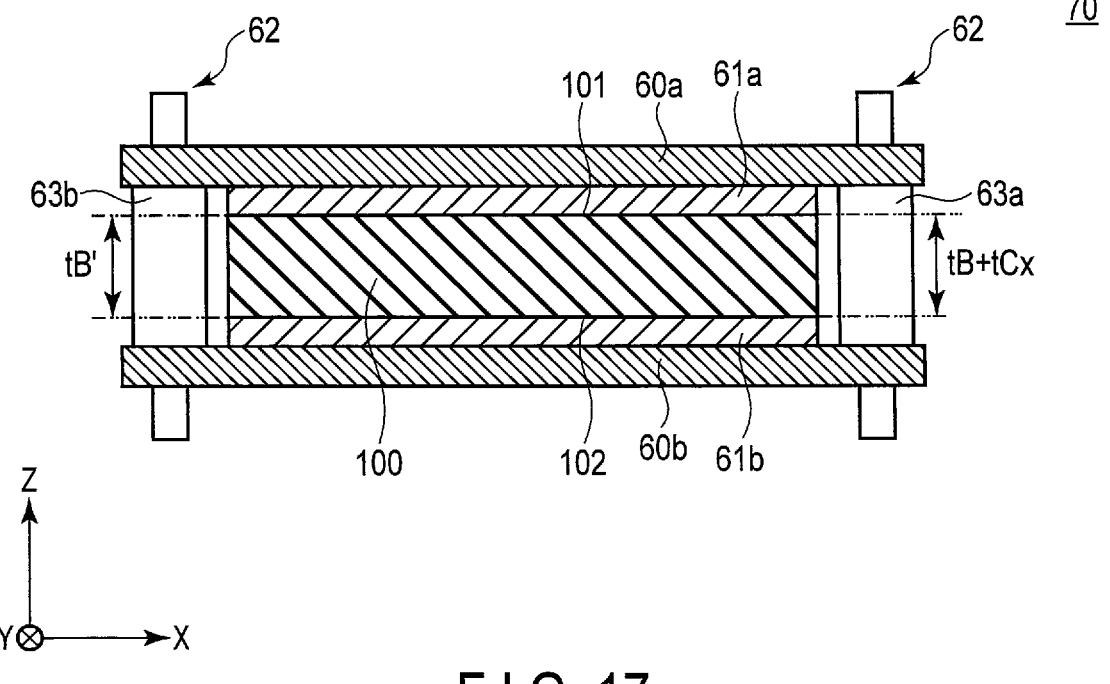
F I G. 17

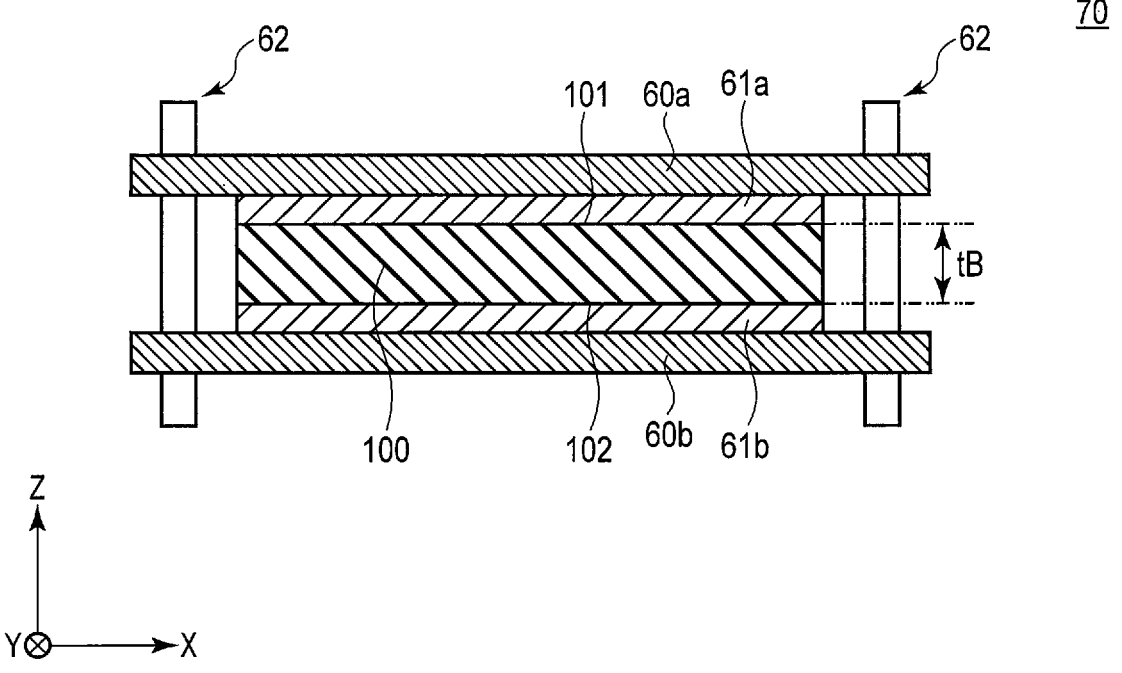
F I G. 18

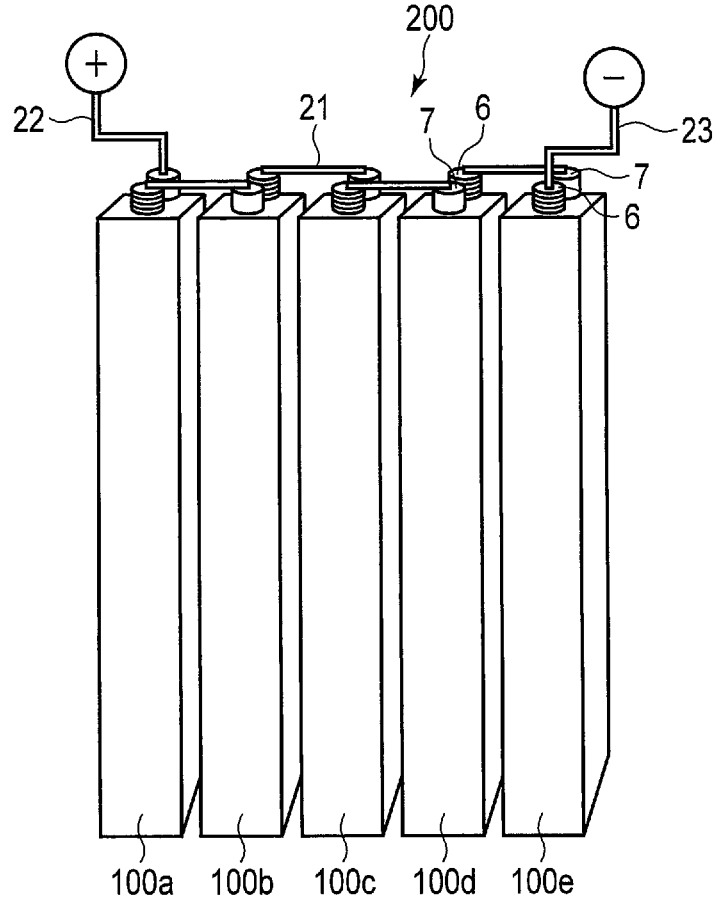
F I G. 19

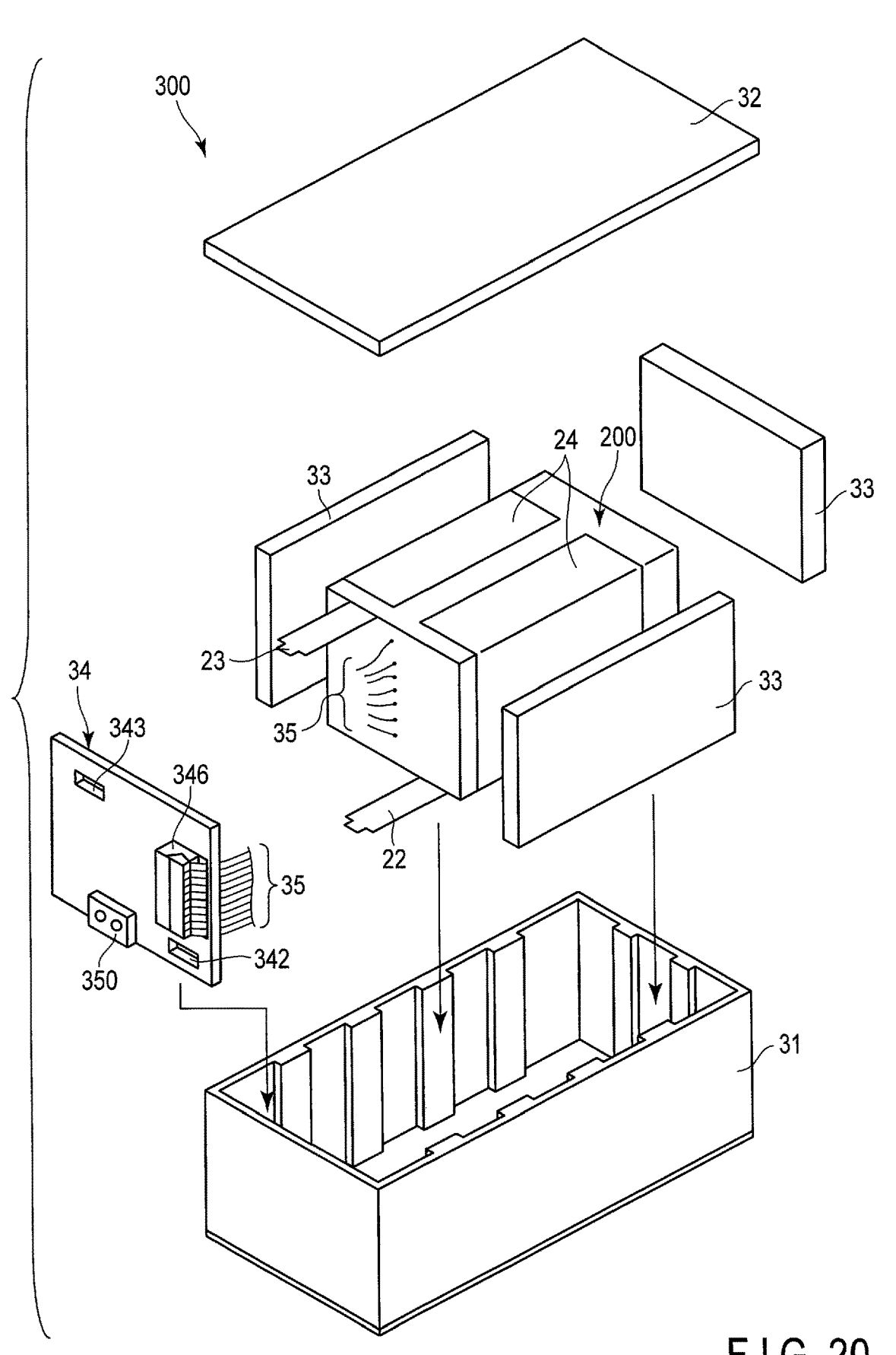
F I G. 20

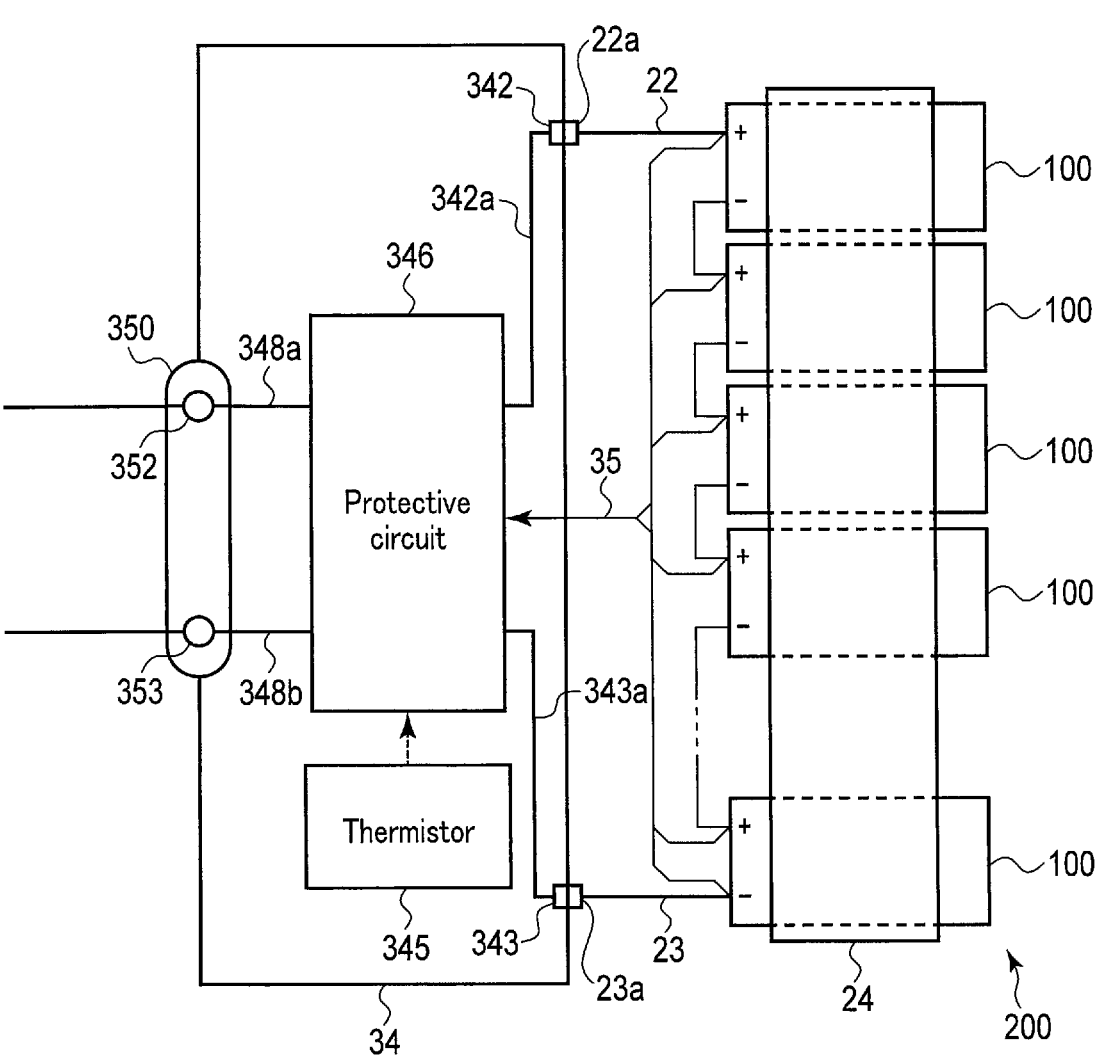
F I G. 21
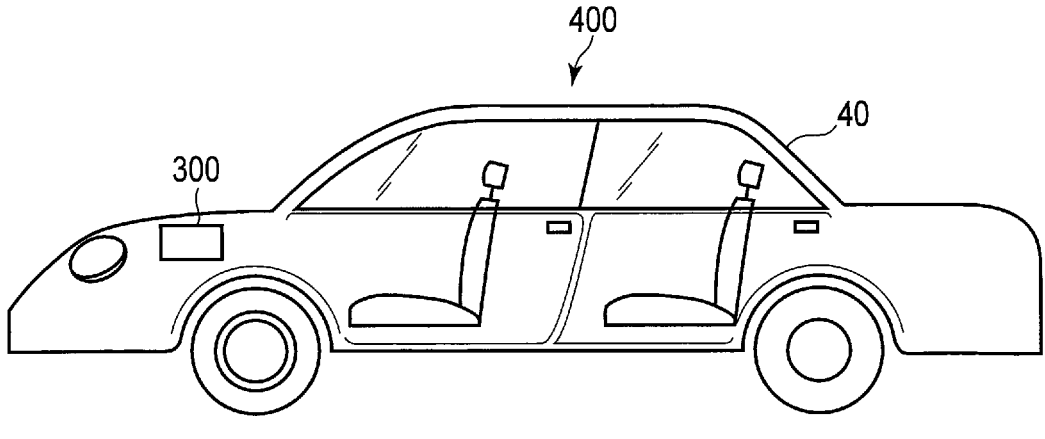
F I G. 22

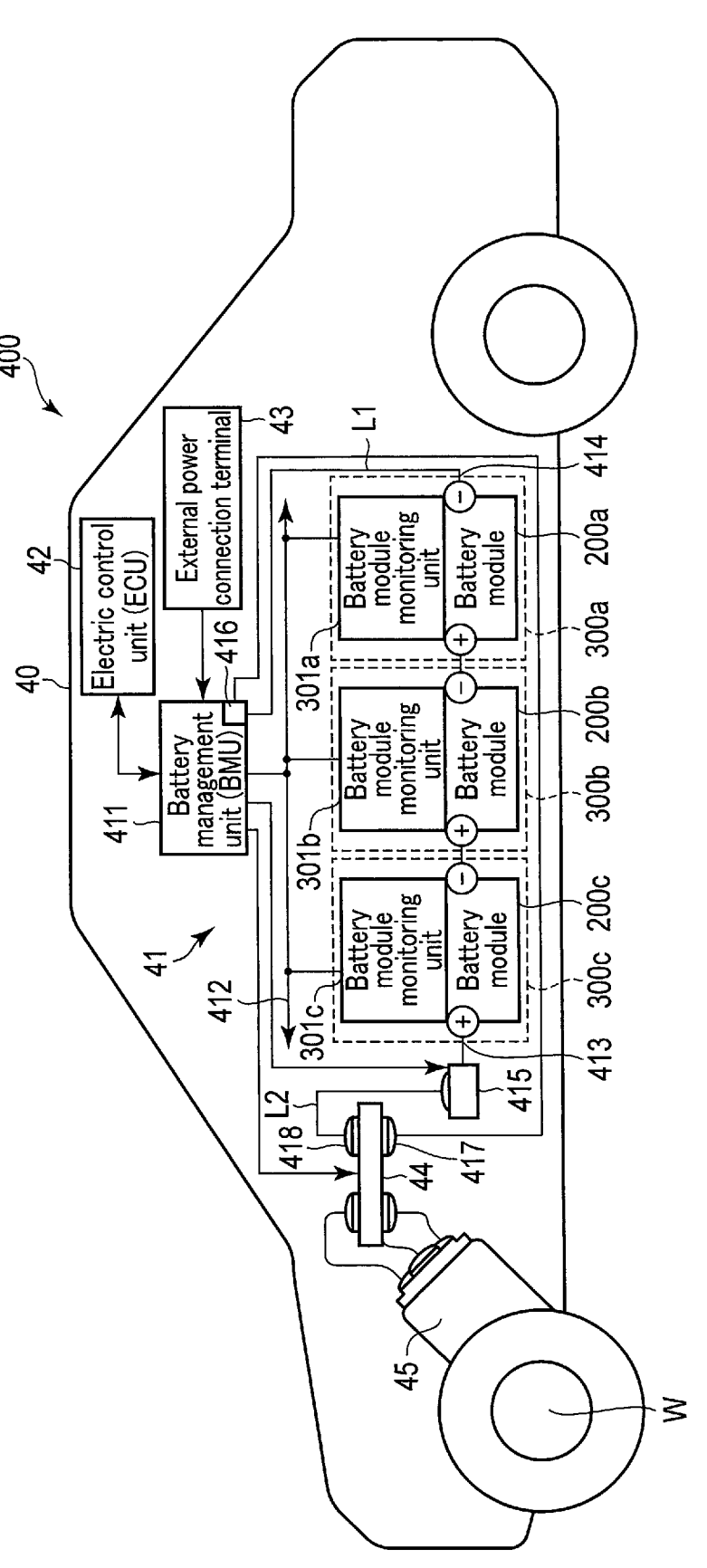
F I G. 23

SECONDARY BATTERY, BATTERY PACK, AND VEHICLE

CROSS-REFERENCE TO RELATED APPLICATIONS

This application is based upon and claims the benefit of priority from Japanese Patent Application No. 2021-208411, filed Dec. 22, 2021, the entire contents of which are incorporated herein by reference.

FIELD

Embodiments described herein relate to a secondary battery, a battery pack, and a vehicle.

BACKGROUND

In recent years, as a high energy density battery, research and development of a secondary battery such as a nonaqueous electrolyte secondary battery, e.g., a lithium ion secondary battery, has been actively advanced. Secondary batteries such as nonaqueous electrolyte secondary batteries are expected as power sources for vehicles such as hybrid electric automobiles and electric automobiles, uninterruptible power supplies for mobile phone base stations, and the like. In addition, since the demand for power supplies for mobile services such as self-travelling industrial robots and drones is rapidly increasing, secondary batteries are also required to be excellent in other performances such as rapid charge-discharge performance and long-term reliability in addition to high energy density.

To produce an electrode for a secondary battery, for example, a method may be adopted in which a slurry for forming an electrode mixture layer is applied onto a metal foil as a current collector and dried to produce a stack of the current collector and the electrode mixture layer, and then the stack is punched into a desired shape.

BRIEF DESCRIPTION OF THE DRAWINGS

FIG. 4 is an enlarged cross-sectional view illustrating the vicinity of a first protrusion in the cross-sectional view of the negative electrode illustrated in FIG. 2.

FIG. 5 is an enlarged cross-sectional view illustrating a modification of the first protrusion.

FIG. 8 is an enlarged cross-sectional view illustrating another modification of the first protrusion.

FIG. 9 is a plan view illustrating measurement positions of a width along a short side direction of the negative electrode included in the secondary battery according to the embodiment.

FIG. 10 is a plan view illustrating measurement positions of a width along a long side direction of the negative electrode included in the secondary battery according to the embodiment.

FIG. 11 is a plan view illustrating measurement positions of a width along the long side direction of the negative electrode included in the secondary battery according to the embodiment.

FIG. 12 is a cross-sectional view schematically illustrating an example of the secondary battery according to the embodiment.

FIG. 13 is an enlarged cross-sectional view of a part B of the secondary battery illustrated in FIG. 12.

FIG. 14 is a cross-sectional view schematically illustrating another example of the secondary battery according to the embodiment.

FIG. 15 is a plan view schematically illustrating a stack including a restraining jig and the secondary battery before initial charging.

FIG. 16 is a cross-sectional view taken along line XVI-XVI, illustrating the stack illustrated in FIG. 15.

FIG. 17 is a cross-sectional view schematically illustrating a state of the stack after the secondary battery included in the stack according to FIG. 16 is initially charged.

FIG. 18 is a cross-sectional view schematically illustrating another method of restraining the secondary battery before the initial charging.

FIG. 19 is a perspective view schematically illustrating an example of a battery module according to the embodiment.

FIG. 20 is an exploded perspective view schematically illustrating an example of a battery pack according to the embodiment.

FIG. 21 is a block diagram illustrating an example of an electric circuit of the battery pack illustrated in FIG. 20.

FIG. 22 is a cross-sectional view schematically illustrating an example of a vehicle according to the embodiment.

FIG. 23 is a diagram schematically illustrating another example of the vehicle according to the embodiment.

DETAILED DESCRIPTION

Figure 1:
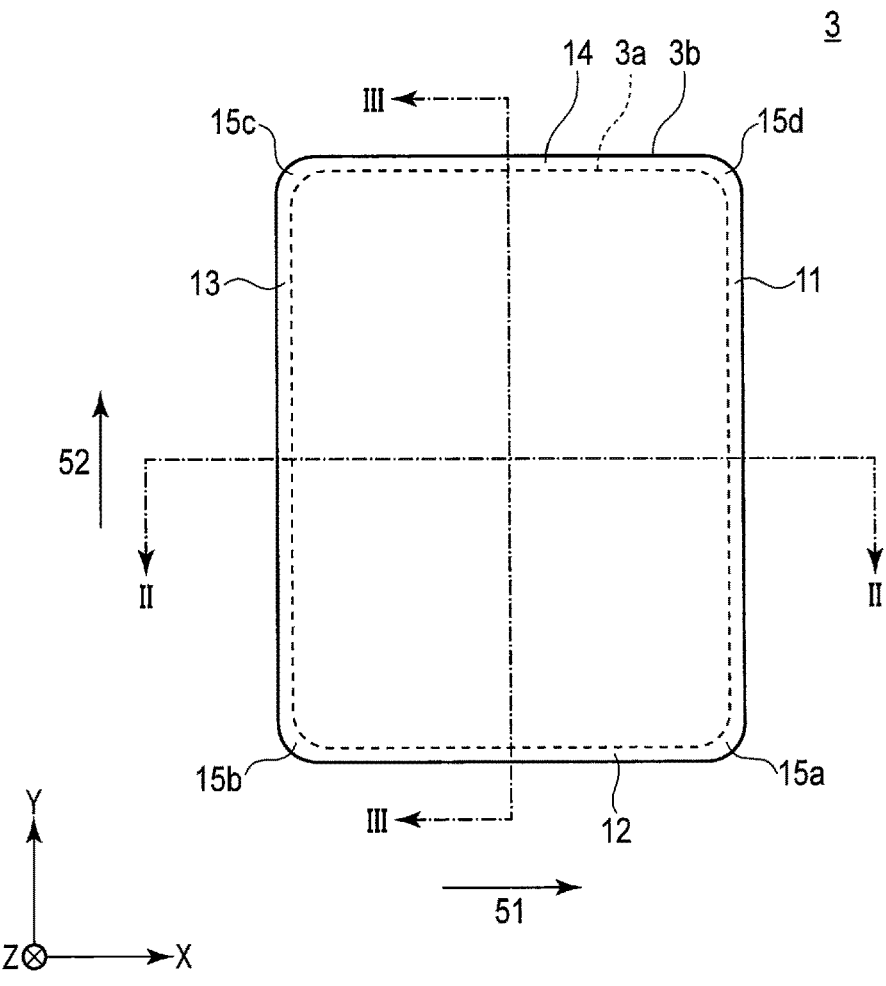
FIG. 1 is a plan view illustrating an example of a negative electrode included in a secondary battery according to an embodiment.

In general, according to one embodiment, a secondary battery including a negative electrode, a positive electrode, and an electrolyte. The negative electrode includes a negative electrode current collector and a negative electrode mixture layer stacked on the negative electrode current collector. The negative electrode mixture layer has a front surface and a back surface. A thickness of the negative electrode current collector is in a range of 8 $\mu$m to 18 $\mu$m. The negative electrode current collector includes a first current collector end surface extending along a stacking direction in which the negative electrode mixture layer is stacked on the negative electrode current collector. The negative electrode mixture layer includes a niobium-titanium composite oxide as a negative electrode active material, and a first protrusion protruding from the first current collector end surface along a first direction orthogonal to the stacking direction. A protrusion length A1 of the first protrusion satisfies 0 mm<A1≤1.0 mm.

According to another embodiment, there is provided a battery pack including the secondary battery.

According to another embodiment, there is provided a vehicle including the secondary battery.

Hereinafter, embodiments will be described with reference to the drawings. The same reference signs are applied to common components throughout the embodiments and overlapped explanations are thereby omitted. Each drawing is a schematic view for encouraging explanations of the embodiment and understanding thereof, and thus there are some details in which a shape, a size and a ratio are different from those in a device actually used, but they can be appropriately design-changed considering the following explanations and known technology.

When a stack of a current collector and an electrode mixture layer is to be punched using a mold, a stress associated with the punching is applied to an end portion of the electrode mixture layer stacked on a surface of the current collector. The end portion of the electrode mixture layer may be broken due to this stress and may slide and fall from the current collector. As a result, the vicinity of the end portion of the current collector is exposed. When the exposed end portion of the current collector comes into contact with a counter electrode, an internal short circuit occurs, and thus there is a problem that a self-discharge amount increases.

First Embodiment

According to a first embodiment, a secondary battery is provided. The secondary battery includes a negative electrode, a positive electrode, and an electrolyte. The negative electrode includes a negative electrode current collector and a negative electrode mixture layer stacked on the negative electrode current collector and having a front surface and a back surface. The negative electrode current collector has a thickness of 8 μm or more and 18 μm or less, and has a first current collector end surface extending along a stacking direction in which the negative electrode mixture layer is stacked on the negative electrode current collector. The negative electrode mixture layer contains a niobium-titanium composite oxide as a negative electrode active material, and has a first protrusion protruding from the first current collector end surface along a first direction orthogonal to the stacking direction. A protrusion length A1 of the first protrusion satisfies 0 mm<A1≤1.0 mm.

In the negative electrode included in the secondary battery according to the embodiment, the end portion of the negative electrode mixture layer supported on the negative electrode current collector protrudes from the end surface of the negative electrode current collector by a predetermined length. In other words, since the front surface or the back surface of the negative electrode current collector is covered with the negative electrode mixture layer in the vicinity of the end portion of the negative electrode current collector, an internal short circuit with the positive electrode hardly occurs. As a result, according to the secondary battery according to the embodiment, it is possible to reduce the frequency of a defect caused by self-discharge.

The negative electrode included in the secondary battery according to an embodiment will be described with reference to the drawings.

Figure 2:
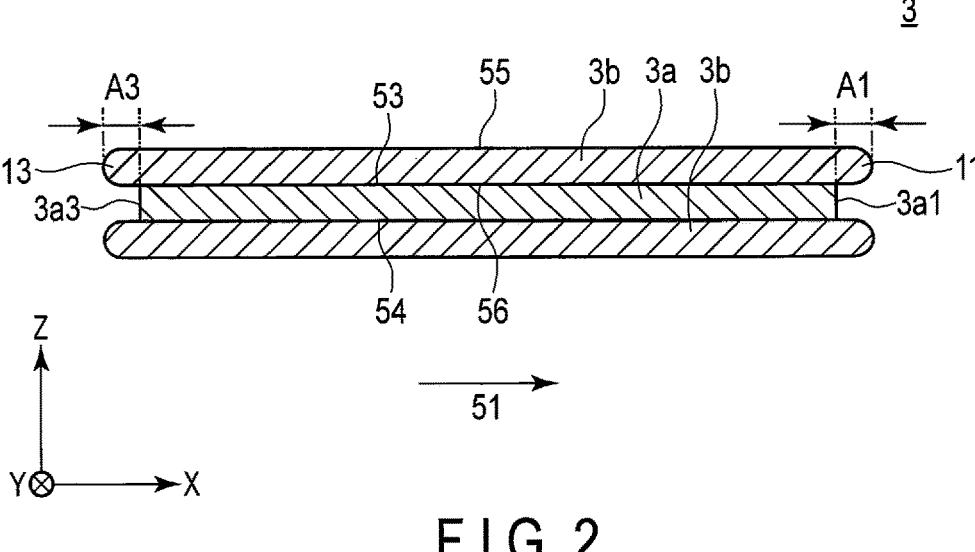
FIG. 2 is a cross-sectional view taken along line II-II, illustrating the negative electrode according to FIG. 1.
Figure 3:
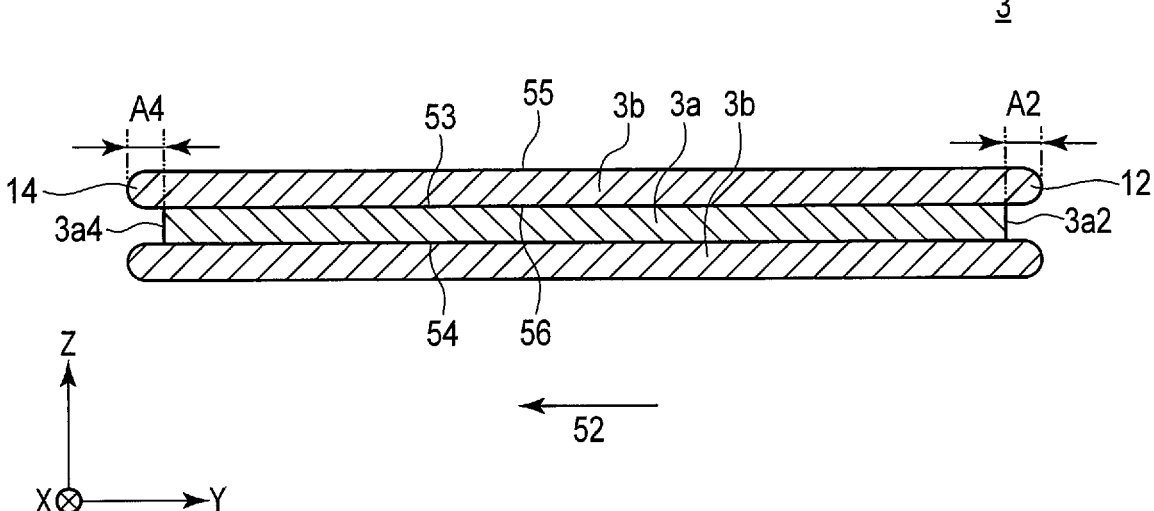
FIG. 3 is a cross-sectional view taken along line illustrating the negative electrode according to FIG. 1.

FIG. 1 is a plan view schematically illustrating an example of the negative electrode included in the secondary battery according to the embodiment. FIG. 2 is a cross-sectional view taken along line II-II, illustrating the negative electrode according to FIG. 1. FIG. 3 is a cross-sectional view taken along line III-III, illustrating the negative electrode according to FIG. 1. In the following description, an X-axis direction and a Y-axis direction are parallel to a main surface of a negative electrode current collector 3a and orthogonal to each other. A Z-axis direction is perpendicular to the X axis direction and the Y axis direction. That is, the Z-axis direction is a thickness direction of the electrode (negative electrode). A direction parallel to the X-axis direction and the Y-axis direction is also referred to as an in-plane direction.

A negative electrode 3 includes the negative electrode current collector 3a and a negative electrode mixture layer 3b formed on at least one surface of the negative electrode current collector 3a. FIGS. 1 to 3 illustrate a case where negative electrode mixture layers 3b are stacked on both of main surfaces of the negative electrode current collector 3a. Although not illustrated, the negative electrode current collector 3a may further include a strip portion (negative electrode current-collecting tab) for extracting a current to the outside. The negative electrode mixture layers 3b are not supported on the negative electrode current-collecting tab.

The shape of a main surface of the negative electrode 3 is not particularly limited, and may be, for example, a square, a rectangle, a circle, an ellipse, or the like. FIGS. 1 to 3 show a case where the main surface of the negative electrode 3 has a rectangular shape. When the main surface of the negative electrode 3 has a shape having a corner portion, such as a square or a rectangle, for example, as indicated by reference signs 15a to 15d in FIG. 1, the corner portion of the electrode may be chamfered to have a round shape. The shape of each main surface of the negative electrode current collector 3a and the shape of the main surfaces of the negative electrode mixture layers 3b may be the same as the shape of the negative electrode 3.

The cross-sectional view illustrated in FIG. 2 is a view schematically illustrating a state in which the negative electrode illustrated in FIG. 1 is cut in a first direction orthogonal to the stacking direction (Z-axis direction) of the negative electrode current collector 3a and the negative electrode mixture layers 3b. The first direction is one of in-plane directions defined by the X-axis direction and the Y-axis direction. In FIGS. 1 to 3, as an example, a case where the first direction is parallel to the X-axis direction will be described. In the negative electrode 3 illustrated in FIG. 1, the first direction 51 is parallel to each of a pair of short sides of the rectangular negative electrode 3. The first direction may be parallel to the Y-axis direction.

Meanwhile, a direction orthogonal to both the stacking direction (Z-axis direction) and the first direction 51 is defined as a second direction 52. The second direction 52 is parallel to the Y-axis direction.

The negative electrode current collector 3a is, for example, a sheet-like metal foil having a front surface 53 and a back surface 54. The negative electrode current collector 3a includes four side surfaces 3a1, 3a2, 3a3, and 3a4 orthogonal to the front surface 53 and the back surface 54. Among the four side surfaces 3a1, 3a2, 3a3, and 3a4, the side surface 3a1 and the side surface 3a3 face each other. The side surface 3a2 and the side surface 3a4 face each other.

As illustrated in FIG. 2, the side surface 3a1 and the side surface 3a3 extend along the stacking direction of the negative electrode current collector 3a and the negative electrode mixture layers 3b and, for example, correspond to long side end surfaces of the rectangular negative electrode 3. The side surface 3a1 is also referred to as a first current collector end surface, and the side surface 3a3 is also referred to as a third current collector end surface. The first current collector end surface 3a1 corresponds to one of a pair of long side end surfaces of the negative electrode current collector 3a. The third current collector end surface 3a3 corresponds to the other of the pair of long side end surfaces of the negative electrode current collector 3a.

As illustrated in FIG. 3, the side surface 3a2 and the side surface 3a4 extend along the stacking direction of the negative electrode current collector 3a and the negative electrode mixture layers 3b and, for example, correspond to the short side end surfaces of the rectangular negative electrode 3. The side surface 3a2 is also referred to as a second current collector end surface, and the side surface 3$a$4 is also referred to as a fourth current collector end surface. The second current collector end surface 3$a$2 corresponds to one of a pair of short side end surfaces of the negative electrode current collector 3$a$. The fourth current collector end surface 3$a$4 corresponds to the other of the pair of short side end surfaces of the negative electrode current collector 3$a$.

Each of the negative electrode mixture layers 3$b$ has a front surface 55 and a back surface 56. One of the two negative electrode mixture layers 3$b$ included in the negative electrode 3 is supported on the front surface 53 of the negative electrode current collector 3$a$. The other of the two negative electrode mixture layers 3$b$ included in the negative electrode 3 is supported on the back surface 54 of the negative electrode current collector 3$a$. The back surfaces 56 of the two negative electrode mixture layers 3$b$ are all in contact with the negative electrode current collector 3$a$.

Hereinafter, unless otherwise specified, the description regarding each of the negative electrode mixture layers 3$b$ is independently applied to both the negative electrode mixture layer 3$b$ supported on the front surface 53 of the negative electrode current collector 3$a$ and the negative electrode mixture layer 3$b$ supported on the back surface 54 of the negative electrode current collector 3$a$. At least one of the two negative electrode mixture layers 3$b$ supported on the front surface 53 and the back surface 54 of the negative electrode current collector 3$a$ has a protrusion having a predetermined length. Both of the two negative electrode mixture layers 3$b$ supported on the front surface 53 and the back surface 54 of the negative electrode current collector 3$a$ may have a protrusion having a predetermined length. One of the two negative electrode mixture layers 3$b$ supported on the front surface 53 and the back surface 54 of the negative electrode current collector 3$a$ may not have a protrusion having a predetermined length described below.

As illustrated in FIG. 2, the negative electrode mixture layer 3$b$ has a first protrusion 11 protruding from the first current collector end surface 3$a$1 along the first direction 51. The protrusion length A1 of the first protrusion 11 satisfies the following formula (1).

$$0 \text{ mm} < A1 \leq 1.0 \text{ mm} \tag{1}$$

Since the first protrusion 11 protrudes by the length satisfying the formula (1), the vicinity of the first current collector end surface 3$a$1 of the negative electrode current collector 3$a$ is easily shielded from the outside of the negative electrode 3. For example, the probability that the negative electrode current collector 3$a$ comes into contact with the positive electrode can be reduced. Therefore, an internal short circuit can be suppressed to reduce the frequency of self-discharge. The fact that the protrusion length A1 of the first protrusion 11 is equal to or less than 0 mm means that the first protrusion 11 does not protrude from the first current collector end surface 3$a$1. In this case, since the effect of shielding the first current collector end surface 3$a$1 by the first protrusion 11 cannot be obtained, the effect of suppressing an internal short circuit cannot be obtained. On the other hand, when the protrusion length A1 of the first protrusion 11 exceeds 1.0 mm, at least a part of the negative electrode mixture layer 3$b$ including the protrusion tends to be broken. When at least a part of the negative electrode mixture layer 3$b$ is broken, the protrusion length A1 may eventually become equal to or less than 0 mm, and thus there is a possibility that the internal short circuit cannot be suppressed as described above. In addition, since the broken protrusion (a part of the mixture layer) floats in the electrolyte, there is a possibility of increasing self-discharge.

The protrusion length A1 of the first protrusion 11 is preferably in the range of 0.1 mm to 0.95 mm, and more preferably in the range of 0.2 mm to 0.8 mm.

As illustrated in FIG. 1, the negative electrode mixture layer 3$b$ may have the first protrusion 11 over the entire long sides of the negative electrode 3, or may have the first protrusion 11 on at least a part of the long sides of the negative electrode 3. The first protrusion 11 may be present on any one of the four sides of the rectangular negative electrode 3.

As illustrated in FIG. 2, the negative electrode mixture layer 3$b$ may further include a third protrusion 13 protruding from the third current collector end surface 3$a$3 along the first direction 51. The protrusion length A3 of the third protrusion 13 satisfies the following formula (3).

$$0 \text{ mm} < A3 \leq 1.0 \text{ mm} \tag{3}$$

When the third protrusion 13 further protrudes by the length satisfying the formula (3), the same effect as that described above for the first protrusion 11 can be obtained. That is, the vicinity of the third current collector end surface 3$a$3 of the negative electrode current collector 3$a$ is easily shielded from the outside of the negative electrode 3. For example, the probability that the negative electrode current collector 3$a$ comes into contact with the positive electrode can be reduced. Therefore, an internal short circuit can be suppressed to reduce the frequency of a defect caused by self-discharge.

As illustrated in FIG. 1, the negative electrode mixture layer 3$b$ may have the third protrusion 13 over the entire long sides of the negative electrode 3, or may have the third protrusion 13 on at least a part of the long sides of the negative electrode 3. The third protrusion 13 may be present on a side opposite to a side where the first protrusion 11 is present among the four sides of the rectangular negative electrode 3.

Next, a second protrusion 12 and a fourth protrusion 14 that can be included in the pair of short sides of the negative electrode 3 will be described. As illustrated in FIG. 3, it is preferable that the negative electrode mixture layer 3$b$ further have the second protrusion 12 protruding from the fourth current collector end surface 3$a$4 along the second direction 52. The protrusion length A2 of the second protrusion 12 satisfies the following formula (2).

$$0 \text{ mm} < A2 \leq 1.0 \text{ mm} \tag{2}$$

When the second protrusion 12 further protrudes by the length satisfying the formula (2), the vicinity of the second current collector end surface 3$a$2 of the negative electrode current collector 3$a$ is easily shielded from the outside of the negative electrode 3. For example, the probability that the negative electrode current collector 3$a$ comes into contact with the positive electrode can be reduced. Therefore, an internal short circuit can be suppressed to reduce the frequency of a defect caused by self-discharge. The fact that the protrusion length A2 of the second protrusion 12 is equal to or less than 0 mm means that the second protrusion 12 does not protrude from the second current collector end surface 3$a$2. In this case, since the effect of shielding the second current collector end surface 3$a$2 by the second protrusion 12 cannot be obtained, the effect of suppressing an internal short circuit cannot be obtained. On the other hand, when the protrusion length A2 of the second protrusion 12 exceeds 1.0 mm, at least a part of the negative electrode mixture layer 3$b$ including the protrusion tends to be broken. When at least a part of the negative electrode mixture layer 3b is broken, the protrusion length A2 may eventually become equal to or less than 0 mm. In addition, since the broken protrusion (a part of the mixture layer) floats in the electrolyte, there is a possibility of increasing self-discharge.

The protrusion length A2 of the second protrusion 12 is preferably in the range of 0.1 mm to 0.95 mm, and more preferably in the range of 0.2 mm to 0.8 mm.

As illustrated in FIG. 1, the negative electrode mixture layer 3b may have the second protrusion 12 over the entire short sides of the negative electrode 3, or may have the second protrusion 12 on at least a part of the short sides of the negative electrode 3. The second protrusion 12 may be present on a side orthogonal to a side where the first protrusion 11 is present among the four sides of the rectangular negative electrode 3.

As illustrated in FIG. 3, the negative electrode mixture layer 3b may further include the fourth protrusion 14 protruding from the fourth current collector end surface 3a4 along the second direction 52. The protrusion length A4 of the fourth protrusion 14 satisfies the following formula (4).

$$0 \text{ mm} < A4 \leq 1.0 \text{ mm} \tag{4}$$

When the fourth protrusion 14 further protrudes by the length satisfying the formula (4), the same effect as that described above for the first protrusion 11 can be obtained. That is, the vicinity of the fourth current collector end surface 3a4 of the negative electrode current collector 3a is easily shielded from the outside of the negative electrode 3. For example, the probability that the negative electrode current collector 3a comes into contact with the positive electrode can be reduced. Therefore, an internal short circuit can be suppressed to reduce the frequency of a defect caused by self-discharge.

The protrusion length A1 and the protrusion length A3 may be the same or substantially the same as each other, but may be different from each other. The protrusion length A2 and the protrusion length A4 may be the same or substantially the same as each other, but may be different from each other. The protrusion length A1 and the protrusion length A2 may be the same or substantially the same as each other, but may be different from each other.

The negative electrode mixture layer 3b may also have protrusions 15a to 15d protruding from the end surface of the current collector at corner portions of four corners of the rectangular negative electrode 3. At least one of the protrusions 15a to 15d at the corner portions of the four corners may not be present.

As the negative electrode current collector 3a, a material that is electrochemically stable at a potential at which lithium (Li) is inserted into and extracted from an active material, for example, at a potential nobler than 1.0 V (vs. Li/Li$^+$) is used. The material of the negative electrode current collector is not particularly limited, but is preferably made of, for example, only aluminum or an aluminum alloy containing one or more elements selected from Mg, Ti, Zn, Mn, Fe, Cu, and Si. Since aluminum is a light metal among metals, the energy density of the battery can be increased when the negative electrode current collector contains aluminum. Aluminum or an aluminum alloy is also preferable in terms of low cost.

The negative electrode current collector has a thickness of 8 μm or more and 18 μm or less. When the thickness of the negative electrode current collector is less than 8 μm, the negative electrode current collector is likely to be broken, and the broken current collector tends to be released into an electrolytic solution to increase self-discharge, which is not preferable. In addition, when an excessively thin current collector is used, it is difficult to manufacture the negative electrode, and there is a concern that the manufacturing cost increases. When the thickness of the negative electrode current collector exceeds 18 μm, the area of the end surface of the negative electrode current collector is increased, so that it is difficult to obtain the effect of suppressing an internal short circuit by the protrusions of the negative electrode mixture layer. The thickness of the negative electrode current collector may be in the range of 10 μm or more and 15 μm or less.

The length of each of the first to fourth protrusions 11 to 14 is, for example, in the range of 5 times to 100 times the thickness (here, "tE") of the negative electrode current collector 3a, preferably in the range of 10 times to 90 times the thickness of the negative electrode current collector 3a. When the ratio is within this range, the negative electrode mixture layer has the protrusions having a length appropriate for the thickness (area of the end surface) of the negative electrode current collector, so that the probability that the negative electrode current collector comes into contact with the positive electrode can be reduced. Therefore, an excellent effect of suppressing self-discharge can be obtained.

The ratio A1/tE of the protrusion length A1 of the first protrusion 11 to the thickness tE of the negative electrode current collector is, for example, in the range of 5 to 100, preferably in the range of 10 to 90. The ratio A2/tE of the protrusion length A2 of the second protrusion 12 to the thickness tE of the negative electrode current collector is, for example, in the range of 5 to 100, preferably in the range of 10 to 90. The ratio A3/tE of the protrusion length A3 of the third protrusion 13 to the thickness tE of the negative electrode current collector is, for example, in the range of 5 to 100, preferably in the range of 10 to 90. The ratio A4/tE of the protrusion length A4 of the fourth protrusion 14 to the thickness tE of the negative electrode current collector is, for example, in the range of 5 to 100, preferably in the range of 10 to 90.

Figure 6:
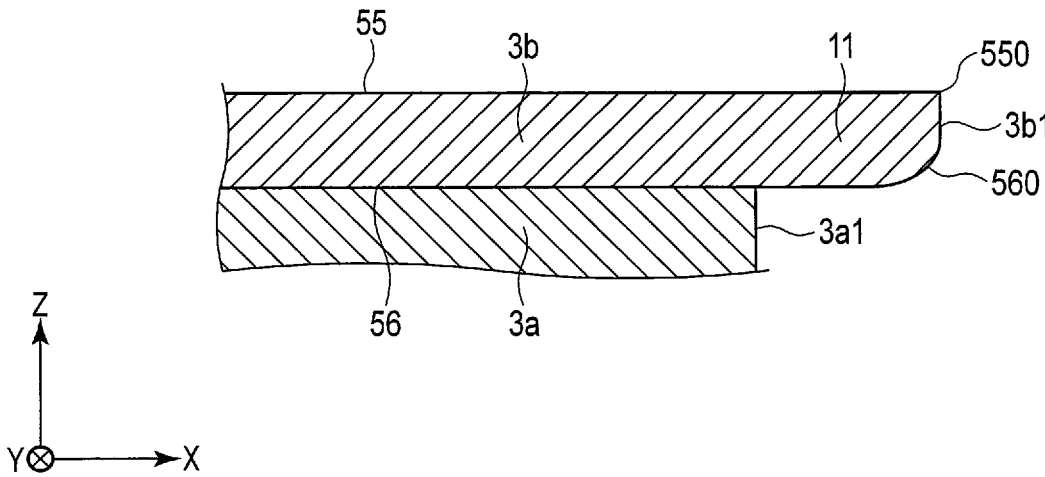
FIG. 6 is an enlarged cross-sectional view illustrating another modification of the first protrusion.
Figure 7:
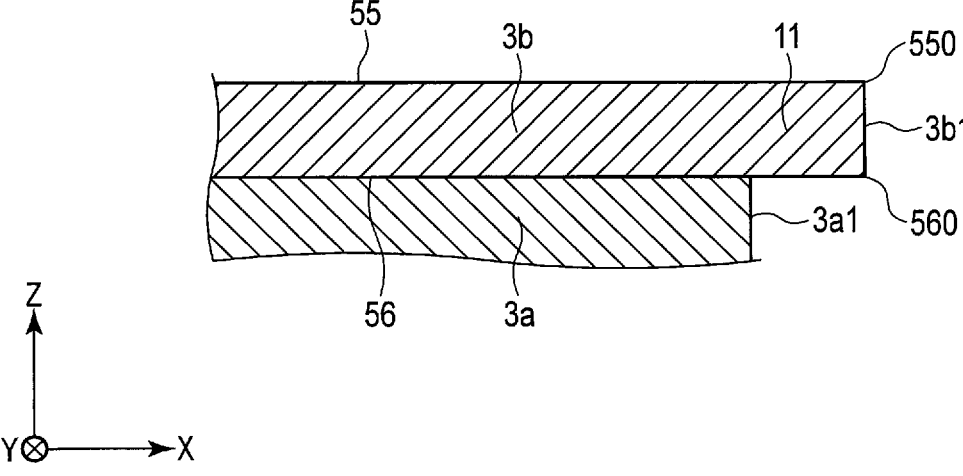
FIG. 7 is an enlarged cross-sectional view illustrating another modification of the first protrusion.

The shape of the first protrusion 11 of the negative electrode mixture layer 3b will be described with reference to FIGS. 4 to 8. The shape of the first protrusion 11 can be, for example, in any one of forms illustrated in FIGS. 4 to 8. FIG. 4 is an enlarged cross-sectional view illustrating the vicinity of the first protrusion 11 in the cross-sectional view of the negative electrode 3 illustrated in FIG. 2. FIG. 5 is an enlarged cross-sectional view illustrating a modification of the first protrusion 11. FIG. 6 is an enlarged cross-sectional view illustrating another modification of the first protrusion 11. FIG. 7 is an enlarged cross-sectional view illustrating another modification of the first protrusion 11. FIG. 8 is an enlarged cross-sectional view illustrating another modification of the first protrusion 11.

According to one example, the shapes of the second protrusion 12 to the fourth protrusion 14 of the negative electrode mixture layer 3b can also be in any one of the forms illustrated in FIGS. 4 to 8.

As illustrated in FIG. 4, the negative electrode mixture layer 3b has a first mixture layer end surface 3b1. The first mixture layer end surface 3b1 is an end surface extending in parallel or substantially parallel to the stacking direction in which the negative electrode mixture layer 3b is stacked on the negative electrode current collector 3a. According to one example, the first mixture layer end surface 3b1 can be an end surface extending in a direction parallel or substantially parallel to the first current collector end surface 3a1 of the negative electrode current collector 3a. The first mixture layer end surface 3b1 can be a part of the first protrusion 11.

The negative electrode mixture layer 3b has a corner portion 550 where the front surface 55 intersects the first mixture layer end surface 3b1. The negative electrode mixture layer 3b has a corner portion 560 where the back surface 56 intersects the first mixture layer end surface 3b1. Although not illustrated, the corner portion 550 and the corner portion 560 extend in the Y-axis direction.

As illustrated in FIGS. 4 to 6 and 8, at least a part of the first protrusion 11 may have a round shape. In FIG. 4, as an example, both the corner portion 550 and the corner portion 560 have a round shape. When each of the corner portions has a round shape, potential concentration on the corner portions is lowered, so that there is an advantage that precipitation of metal ions at the corner portions hardly occurs. Therefore, when at least a part of the first protrusion 11 has a round shape, the capacity retention rate is excellent.

The first protrusion 11 may have the forms illustrated in FIGS. 5 and 6. In the example illustrated in FIG. 5, the corner portion 550 has a round shape, and the corner portion 560 does not have a round shape. In the example illustrated in FIG. 6, the corner portion 550 does not have a round shape, and the corner portion 560 has a round shape. Also in the cases illustrated in FIGS. 5 and 6, since the potential concentration on the corner portions is lowered, precipitation of metal ions at the corner portions hardly occurs, and the effect of excellent capacity retention rate can be obtained.

As illustrated in FIG. 7, the first protrusion 11 may not have a round shape. Also in this case, since the vicinity of the first current collector end surface 3a1 is shielded by the first protrusion 11, an internal short circuit can be suppressed.

The first protrusion 11 may have the form illustrated in FIG. 8. In the form illustrated in FIG. 8, at least a part of the first protrusion 11 is warped toward the negative electrode current collector 3a side (back surface 56 side). For example, at least a part of the first protrusion 11 covers the first current collector end surface 3a1 of the negative electrode current collector 3a. Therefore, it is possible to prevent the corner portion of the first current collector end surface 3a1 from being broken. In addition, in this aspect, since at least a part of the first protrusion 11 has a round shape, as described above, the potential concentration on the corner portions of the mixture layer is lowered. Therefore, precipitation of metal ions at the corner portions hardly occurs, and the effect of excellent capacity retention rate can be obtained.

<Method of Measuring Layer Thickness and Protrusion Length of Each Layer>

Subsequently, a method of measuring the layer thicknesses of the negative electrode current collector and the negative electrode mixture layer and the protrusion lengths of the respective protrusions will be described with reference to FIGS. 9 to 11. FIGS. 9 to 11 are plan views of the negative electrode 3 described with reference to FIGS. 1 to 3. The negative electrode 3 illustrated in FIGS. 9 to 11 has the same structure as that of the negative electrode 3 described with reference to FIGS. 1 to 3, except that the negative electrode current collector 3a further includes a negative electrode current-collecting tab 3c.

First, the secondary battery to be measured is brought into a fully discharged state. For example, discharging the battery at a current of 0.1 C in an environment of 25° C. until the rated end voltage or the battery voltage reaches 1.0 V is repeated a plurality of times so that the current value at the time of discharging is $\frac{1}{100}$ or less of the rated capacity, whereby the battery can be brought into a fully discharged state. Remaining lithium ions may be present even in the discharged state.

The secondary battery incorporating the electrode in a state of charge (0%) is disassembled in a glove box filled with argon. The electrode to be measured is taken out from the disassembled secondary battery. The electrode is cleaned with an appropriate solvent. As the solvent used for the cleaning, for example, ethyl methyl carbonate or the like may be used. When the cleaning is insufficient, it may be difficult to observe particles due to the effects of lithium carbonate, lithium fluoride, or the like remaining in the electrode.

Here, a method of measuring the respective protrusion lengths of the first protrusion 11 and the third protrusion 13 located on the long sides will be described with reference to FIG. 9 on the assumption that the taken-out electrode (here, the negative electrode) has a rectangular shape or a substantially rectangular shape.

The length LL of the long side of the negative electrode 3 is measured, and the length LL of the long side is divided into four equal parts to define sections L1 to L4. Then, widths W1 to W3 of the negative electrode mixture layer 3b along the short side direction of the negative electrode mixture layer 3b are measured at positions of a length of ¼, a length of ½, and a length of ¾ of the length LL of the long side. The positions of the length of ¼, the length of ½, and the length of ¾ of the length LL of the long side correspond to a position separating the sections L1 and L2, a position separating the sections L2 and L3, and a position separating the sections L3 and L4, respectively. This measurement can be performed using, for example, a scale such as a ruler. A value obtained by averaging the measured values of the widths W1 to W3 is regarded as the width (width along the short side direction) of the negative electrode mixture layer 3b.

Meanwhile, the negative electrode 3 is cut with an ion milling apparatus at each of the positions of the length of ¼, the length of ½, and the length of ¾ of the length LL of the long side, and each cross section of the negative electrode 3 is observed with a scanning electron microscope (SEM). The SEM observation is performed by the following procedure.

The cut cross sections of the electrode are attached to an SEM sample stage. At this time, processing is performed using a conductive tape or the like so that the electrode does not peel off or float from the sample stage. The SEM is used to observe the electrode (mixture layer) attached to the SEM sample stage to obtain an SEM image. During the SEM measurement, the observation is performed at a magnification of 10,000 times so that the protrusions of the negative electrode mixture layer are included in the visual field. When the electrode is introduced into a sample chamber, it is preferable to maintain an inert atmosphere.

The shapes of the first protrusion and the third protrusion can be observed by observing the cross sections of the negative electrode with the SEM.

Thereafter, the negative electrode mixture layer 3b is peeled off to expose the surface of the negative electrode current collector 3a. Then, the width of the negative electrode current collector 3a is measured at each position where the widths W1 to W3 along the short side direction of the negative electrode mixture layer 3b are measured. A value obtained by averaging the three obtained values is regarded as the width of the negative electrode current collector 3a along the short side direction of the negative electrode current collector 3a.

The total length of the protrusion length A1 of the first protrusion 11 and the protrusion length A3 of the third protrusion 13 can be calculated by subtracting the width of the negative electrode current collector 3a along the short side direction of the negative electrode current collector 3a from the previously determined width of the negative electrode mixture layer 3b along the short side direction of the negative electrode mixture layer 3b. A value obtained by dividing the calculated total length by 2 is regarded as the protrusion length A1 and the protrusion length A3. Alternatively, from the SEM image obtained by the above method, the protrusion length A1 of the first protrusion and the protrusion length A3 of the third protrusion may be measured using the length measuring function of the SEM.

When the thickness tE of the negative electrode current collector and the thickness of the negative electrode mixture layer 3b are to be measured, for example, the thickness tE of the negative electrode current collector and the thickness of the negative electrode mixture layer 3b are measured at the center position of the image in the width direction of the image including each protrusion and obtained as described above.

Next, a method of measuring the respective protrusion lengths of the second protrusion 12 and the fourth protrusion 14 located on the short sides will be described with reference to FIGS. 10 and 11. FIG. 10 illustrates a case where the negative electrode current-collecting tab 3c is present at a central or substantially central position on the short side of the negative electrode 3. FIG. 11 illustrates a case where the negative electrode current-collecting tab 3c is present at a position close to an end portion on the short side of the negative electrode 3. The position of the negative electrode current-collecting tab 3c is not particularly limited. Therefore, the protrusion length of each of the second protrusion 12 and the fourth protrusion 14 can be measured according to the method described with reference to either FIG. 10 or FIG. 11 according to the position of the negative electrode current-collecting tab 3c included in the negative electrode 3 to be measured.

FIG. 10 will be described. The width wT of the negative electrode current-collecting tab 3c is subtracted from the length LS of one short side of the negative electrode 3 using a scale such as a ruler. By dividing the obtained value by 2, lengths LS1 and LS2 of portions that are present on one short side of the negative electrode 3 and do not have the negative electrode current-collecting tab 3c are determined. The lengths LS1 and LS2 are substantially the same value. The lengths LS1 and LS2 are each divided into two equal parts to define sections S1 and S2 and sections S3 and S4. Then, a width W4 of the negative electrode mixture layer 3b along the long side direction of the negative electrode mixture layer 3b is measured at a position separating the sections S1 and S2. In addition, a width W5 of the negative electrode mixture layer 3b along the long side direction of the negative electrode mixture layer 3b is measured at a position separating the sections S3 and S4. This measurement can be performed using, for example, a scale such as a ruler. A value obtained by averaging the measured values of the widths W4 and W5 is regarded as the width (width along the long side direction) of the negative electrode mixture layer 3b.

FIG. 11 will be described. The length LS of one short side of the negative electrode 3 is measured using a scale such as a ruler. In the short side, a length of a side of a portion having a large length excluding the width wT of the negative electrode current-collecting tab 3c is defined as LS3. The length LS3 is divided into three equal parts to define sections S5 to S7. A width W6 of the negative electrode mixture layer 3b along the long side direction of the negative electrode mixture layer 3b is measured at a position separating the sections S5 and S6. In addition, a width W7 of the negative electrode mixture layer 3b along the long side direction of the negative electrode mixture layer 3b is measured at a position separating the sections S6 and S7. This measurement can be performed using, for example, a scale such as a ruler. A value obtained by averaging the measured values of the widths W6 and W7 is regarded as the width (width along the long side direction) of the negative electrode mixture layer 3b.

Further, the negative electrode 3 is cut with an ion milling apparatus at each position where the widths W4 to W7 of the negative electrode mixture layer 3b along the long side direction of the negative electrode mixture layer 3b are measured, and each cross section of the negative electrode 3 is observed with a scanning electron microscope (SEM). The shapes of the second protrusion and the fourth protrusion can be observed by observing the cross sections of the negative electrode with the SEM.

Thereafter, the negative electrode mixture layer 3b is peeled off to expose the surface of the negative electrode current collector 3a. Then, widths of the negative electrode current collector 3a along the long side direction of the negative electrode current collector 3a are measured at each position where the widths W4 and W5 along the long side direction of the negative electrode mixture layer 3b are measured or at each position where the widths W6 and W7 along the long side direction of the negative electrode mixture layer 3b are measured. A value obtained by averaging the two obtained values is regarded as the width of the negative electrode current collector 3a along the long side direction of the negative electrode current collector 3a.

The total length of the protrusion length A2 of the second protrusion 12 and the protrusion length A4 of the fourth protrusion 14 can be calculated by subtracting the width of the negative electrode current collector 3a along the long side direction of the negative electrode current collector 3a from the previously determined width of the negative electrode mixture layer 3b along the long side direction of the negative electrode mixture layer 3b. A value obtained by dividing the calculated total length by 2 is regarded as the protrusion length A2 and the protrusion length A4. Alternatively, from an SEM image obtained by the above method, the protrusion length A2 of the second protrusion and the protrusion length A4 of the fourth protrusion may be measured using the length measuring function of the SEM.

<Details of Secondary Battery>

Hereinafter, details of the secondary battery will be described. According to the present embodiment, a secondary battery including a negative electrode, a positive electrode, and an electrolyte is provided.

The secondary battery additionally can comprise a separator disposed between the positive electrode and the negative electrode. The negative electrode, the positive electrode, and the separator can constitute an electrode group. The electrolyte can be held in the electrode group.

The secondary battery additionally can comprise a container member that houses the electrode group and the electrolyte.

Furthermore, the secondary battery additionally can comprise a negative electrode terminal electrically connected to the negative electrode and a positive electrode terminal electrically connected to the positive electrode.

The secondary battery can be, for example, a lithium secondary battery. The secondary battery may be a nonaqueous electrolyte secondary battery including a nonaqueous electrolyte.

Hereinafter, the negative electrode, the positive electrode, the electrolyte, the separator, the container member, the negative electrode terminal, and the positive electrode terminal will be described in detail.

(1) Negative Electrode

The negative electrode may include a negative electrode current collector and a negative electrode mixture layer. The negative electrode mixture layer may be formed on one or both of surfaces of the negative electrode current collector. The negative electrode mixture layer can contain a negative electrode active material, and optionally an electro-conductive agent and a binder.

The thickness of the negative electrode mixture layer is not particularly limited, but is, for example, in the range of 3 μm to 250 μm. In particular, from the viewpoint of achieving both excellent energy density and output characteristics, the thickness of the negative electrode mixture layer is preferably in the range of 10 μm to 100 μm.

The negative electrode active material includes a niobium-titanium composite oxide. The niobium-titanium composite oxide has, for example, a monoclinic crystal structure. The monoclinic niobium-titanium composite oxide is, for example, at least one selected from the group consisting of a composite oxide represented by general formula $Li_xTi_{1-y}M1_yNb_{2-z}M2_zO_{7+\delta}$, and a composite oxide represented by general formula $Li_xTi_{1-y}M3_{y+z}Nb_{2-z}O_{7-\delta}$. Here, M1 is at least one selected from the group consisting of Zr, Si, and Sn. M2 is at least one selected from the group consisting of V, Ta, and Bi. M3 is at least one selected from the group consisting of Mg, Fe, Ni, Co, W, Ta, and Mo. Each subscript in the composition formula satisfies $0 \leq x \leq 5$, $0 \leq y < 1$, $0 \leq z < 2$, and $-0.3 \leq \delta \leq 0.3$.

Specific examples of the monoclinic niobium-titanium composite oxides include $Nb_2TiO_7$, $Nb_2Ti_2O_9$, $Nb_{10}Ti_2O_{29}$, $Nb_{14}TiO_{37}$, and $Nb_{24}TiO_{62}$. The monoclinic niobium-titanium composite oxide may be a substituted niobium-titanium composite oxide in which at least a part of Nb and/or Ti is substituted with an another element. Examples of the another element include Na, K, Ca, Co, Ni, Si, P, V, Cr, Mo, Ta, Zr, Mn, Fe, Mg, B, Pb, and Al. The substituted niobium-titanium composite oxide may include one kind or two or more kinds of the another element.

The negative electrode active material may contain an active material other than niobium-titanium composite oxide. Examples of the other active material include lithium titanate (for example, $Li_{2+y}Ti_3O_7$, $0 \leq y \leq 3$) having a ramsdellite structure, lithium titanate (for example, $Li_{4+x}Ti_5O_{12}$, $0 \leq x \leq 3$) having a spinel structure, titanium dioxide ($TiO_2$), niobium pentoxide ($Nb_2O_5$), anatase titanium dioxide, rutile titanium dioxide, hollandite titanium composite oxide, and orthorhombic titanium-containing composite oxide.

Examples of the orthorhombic titanium-containing composite oxide include a compound represented by $Li_{2+a}M(I)_{2-b}Ti_{6-c}M(II)_dO_{14+\sigma}$. Here, M(I) is at least one selected from the group consisting of Sr, Ba, Ca, Mg, Na, Cs, Rb, and K. M(II) is at least one selected from the group consisting of Zr, Sn, V, Nb, Ta, Mo, W, Y, Fe, Co, Cr, Mn, Ni and Al. The respective subscripts in the composition formula are specified as follows: $0 \leq a \leq 6$, $0 \leq b < 2$, $0 \leq c < 6$, $0 \leq d < 6$, and $-0.5 \leq \sigma \leq 0.5$. Specific examples of the orthorhombic titanium-containing composite oxide include $Li_{2+a}Na_2Ti_6O_{14}$ ($0 \leq a \leq 6$).

The proportion of the niobium-titanium composite oxide in the negative electrode active material is, for example, 50 mass % or more, preferably 80 mass or more.

The negative electrode active material may be a single primary particle, a secondary particle in which primary particles are aggregated, or a mixture of primary particles and secondary particles.

The average particle size (D50) of the negative electrode active material is preferably in the range of 1 μm or more and 10 μm or less. The shapes of the particles may be either granular or fibrous. The average particle size of the active material particles can be measured using, for example, a laser diffraction/scattering type particle size analyzer. As the measuring apparatus, for example, a laser diffraction/scattering type particle size analyzer (model: MT3000-II) manufactured by MicrotracBEL Corp. can be used.

A conductive material is blended in order to enhance current collection performance and suppress contact resistance between the active material and the current collector. Examples of the conductive material include vapor grown carbon fiber (VGCF), carbon black such as acetylene black, and carbonaceous substances such as graphite. One of them may be used as the conductive material, or two or more of them may be used in combination as the conductive material. Alternatively, instead of using the conductive material, carbon coating or electron conductive inorganic material coating may be applied to the surface of the active material particles.

A binder is blended to fill gaps of the dispersed active material and to bind the active material and the negative electrode current collector. Examples of the binder include polytetrafluoroethylene (PTFE), polyvinylidene fluoride (PVdF), fluororubber, styrene-butadiene rubber, polyacrylic acid compounds, imide compounds, carboxymethyl cellulose (CMC), and salts of CMC. One of them may be used as the binder, or two or more of them may be used in combination as the binder.

The blending ratio of the negative electrode active material, the conductive material, and the binder in the negative electrode mixture layer can be appropriately changed according to the application of the negative electrode. For example, it is preferable to blend the negative electrode active material, the conductive material, and the binder in proportions of 70 mass % or more and 96 mass % or less, 2 mass % or more and 28 mass % or less, and 2 mass % or more and 28 mass % or less, respectively. When the amount of the conductive material is 2 mass % or more, the current collecting performance of the negative electrode mixture layer can be improved. When the amount of the binder is 2 mass % or more, the binding property between the negative electrode mixture layer and the current collector is sufficient, and excellent cycle performance can be expected. On the other hand, the content of each of the conductive material and the binder is preferably 28 mass % or less in order to increase the capacity.

The density of the negative electrode mixture layer (not including the current collector) is preferably 2.1 g/cm³ or more and 3.0 g/cm³ or less. The negative electrode in which the density of the negative electrode mixture layer is within this range is excellent in energy density and electrolyte retention. The electrode density of the negative electrode mixture layer is more preferably 2.4 g/cm³ or more and 2.8 g/cm³ or less.

The negative electrode can be produced, for example, by the following method. First, the active material, the electro-conductive agent, and the binder are suspended in a solvent to prepare a slurry. The slurry is applied to one or both of the surfaces of the current collector. Next, the applied slurry is dried to obtain a stack of the mixture layer and the current collector. Thereafter, the stack is pressed. In this way, the negative electrode before initial charging is produced. After the secondary battery is assembled using the negative electrode before the initial charging, the initial charging is performed according to a method described later, whereby the negative electrode having the first protrusion described above can be produced.

(2) Positive Electrode

The positive electrode may include a positive electrode current collector and a positive electrode mixture layer. The positive electrode mixture layer may be formed on one or both of surfaces of the positive electrode current collector. The positive electrode mixture layer can contain a positive electrode active material, and optionally an electro-conductive agent and a binder. A polymer fiber layer described later may be stacked on the positive electrode mixture layer. The positive electrode on which the polymer fiber layer is stacked may be a positive electrode structure.

Examples of the positive electrode active material include oxides and sulfides. The positive electrode may include, as the positive electrode active material, one type of compound or two or more different types of compounds. Examples of the oxides and the sulfides may include compounds allowing lithium or lithium ions to be inserted thereinto or extracted therefrom.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x\leq1$), iron sulfates [$Fe_2(SO_4)_3$], vanadium oxides (e.g., $V_2O_5$), and lithium nickel cobalt manganese composite oxides ($Li_xNi_{1-y-z}Co_yMn_zO_2$; $0<x\leq1$, $0<y<1$, $0<z<1$, y+z<1).

Among the above, examples of compounds more preferable as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, y+z<1). The positive electrode potential can be made high by using these positive electrode active materials.

When a room temperature molten salt is used as the electrolyte of the battery, it is preferable to use a positive electrode active material including lithium iron phosphate, $Li_xVPO_4F$ ($0\leq x\leq1$), lithium manganese composite oxide, lithium nickel composite oxide, lithium nickel cobalt composite oxide, or a mixture thereof. Since these compounds have low reactivity with room temperature molten salts, cycle life can be improved. Details regarding the room temperature molten salt are described later.

The positive electrode active material may preferably have primary particle sizes in the range of 100 nm to 1 μm. The positive electrode active material having primary particle sizes of 100 nm or more may be easy to handle in industrial applications. The positive electrode active material having primary particle sizes of 1 μm or less may allow lithium ions to be smoothly diffused in solid.

The positive electrode active material may preferably have a specific surface area in the range of 0.1 $m^2$/g to 10 $m^2$/g. The positive electrode active material having a specific surface area of 0.1 $m^2$/g or more may secure an adequately large site for insertion and extraction of Li ions. The positive electrode active material having a specific surface area of 10 $m^2$/g or less may be easy to handle in industrial applications and may ensure a favorable charge-and-discharge cycle.

The binder is blended in order to fill a gap between the dispersed positive electrode active materials and to bind the positive electrode active material and the positive electrode current collector. Examples of the binder include polytetrafluoroethylene (PTFE), polyvinylidene fluoride (PVdF), fluorine rubber, polyacrylic acid compounds, imide compounds, carboxy methyl cellulose (CMC), and salts of CMC. One of these may be used as the binder, or a combination of two or more thereof may be used as the binder.

A conductive agent is added in order to increase the current-collecting performance and suppress the contact resistance between the positive electrode active material and the positive electrode current collector. Examples of the conductive agent include carbonaceous materials such as vapor grown carbon fibers (VGCF), carbon black such as acetylene black, carbonaceous material such as graphite. One of these materials may be used as the conductive agent, or two or more of these materials may be combined and used as the conductive agent. In addition, the conductive agent can be omitted.

In the positive electrode mixture layer, it is preferable to combine the positive electrode active material and the binder in a mass ratio of the positive electrode active material in a range from 80% to 98% and the binder in a range from 2% to 20%.

By making the amount of the binder be 2% by mass or greater, sufficient electrode strength is obtained. In addition, the binder may function as an insulator. For this reason, if the amount of the binder is kept at 20% by mass or less, the amount of insulation contained in the electrode is decreased, and therefore the internal resistance can be reduced.

In the case of adding the conductive agent, it is preferable to combine the positive electrode active material, the binder, and the conductive agent in a mass ratio of the positive electrode active material in a range from 77% to 95%, the binder in a range from 2% to 20%, and conductive agent in a range from 3% to 15%.

By making the amount of the conductive agent be 3% by mass or greater, the effects described above can be exhibited. Also, by keeping the amount of the conductive agent to 15% by mass or less, the proportion of the conductive agent in contact with electrolyte can be lowered. If this proportion is low, decomposition of the electrolyte under high-temperature storage can be reduced.

The positive electrode current collector is preferably an aluminum foil or an aluminum alloy foil containing one or more elements selected from Mg, Ti, Zn, Ni, Cr, Mn, Fe, Cu, and Si.

The thickness of the aluminum foil or aluminum alloy foil is preferably within a range from 5 μm to 20 μm, and is more preferably 15 μm or less. The purity of the aluminum foil is preferably 99% by mass or more. The content of transition metals such as iron, copper, nickel, and chromium contained in the aluminum foil or aluminum alloy foil is preferably 1% by mass or less.

In addition, the positive electrode current collector can include a portion where the positive electrode mixture layer is not formed on the surface thereof. This portion can serve as a positive electrode tab.

The positive electrode can be produced, for example, by the following method. First, an active material, a conductive agent, and a binder are suspended in a solvent to prepare a slurry. This slurry is applied to one side or both sides of the current collector. Next, the applied slurry is dried to obtain a laminate of the mixture layer and the current collector. Thereafter, the laminate is pressed. The positive electrode is thus produced.

Alternatively, the positive electrode may be produced by the following method. First, an active material, a conductive agent, and a binder are mixed to obtain a mixture. The mixture is then formed into pellets. Subsequently, these pellets can be arranged on the current collector to obtain a positive electrode.

(3) Electrolyte

Examples of the electrolyte may include liquid nonaqueous electrolyte or gel nonaqueous electrolyte. The liquid nonaqueous electrolyte may be prepared by dissolving an electrolyte salt used as solute in an organic solvent. The electrolyte salt may preferably have a concentration in the range of 0.5 mol/L to 2.5 mol/L.

Examples of the electrolyte salt include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$], and mixtures thereof. The electrolyte salt is preferably resistant to oxidation even at a high potential, and most preferably $LiPF_6$.

Examples of the organic solvent include cyclic carbonates such as propylene carbonate (PC), ethylene carbonate (EC), or vinylene carbonate (VC); linear carbonates such as diethyl carbonate (DEC), dimethyl carbonate (DMC), or methyl ethyl carbonate (MEC); cyclic ethers such as tetrahydrofuran (THF), 2-methyl tetrahydrofuran (2-MeTHF), or dioxolane (DOX); linear ethers such as dimethoxy ethane (DME) or diethoxy ethane (DEE); γ-butyrolactone (GEL), acetonitrile (AN), and sulfolane (SL). These organic solvents may be used singularly or as a mixed solvent.

The gel nonaqueous electrolyte is prepared by obtaining a composite of a liquid nonaqueous electrolyte and a polymeric material. Examples of the polymeric material include polyvinylidene fluoride (PVDF), polyacrylonitrile (PAN), polyethylene oxide (PEO), and mixtures thereof.

Alternatively, besides the liquid nonaqueous electrolyte and the gel nonaqueous electrolyte, a room-temperature molten salt (ionic melt) containing lithium ions, a polymer solid electrolyte, an inorganic solid electrolyte, and the like may also be used as the nonaqueous electrolyte.

The room temperature molten salt (ionic melt) indicates compounds among organic salts made of combinations of organic cations and anions, which are able to exist in a liquid state at room temperature (15° C. to 25° C.). The room temperature molten salt includes a room temperature molten salt which exists alone as a liquid, a room temperature molten salt which becomes a liquid upon mixing with an electrolyte salt, a room temperature molten salt which becomes a liquid when dissolved in an organic solvent, and mixtures thereof. In general, the melting point of the room temperature molten salt used in secondary batteries is 25° C. or below. The organic cations generally have a quaternary ammonium framework.

A polymer solid electrolyte is prepared by dissolving an electrolyte salt into a polymer material and solidifying the result.

An inorganic solid electrolyte is solid material having Li-ion conductivity.

The electrolyte may also be an aqueous electrolyte containing water.

The aqueous electrolyte includes an aqueous solvent and an electrolyte salt. The aqueous electrolyte is liquid, for example. A liquid aqueous electrolyte is an aqueous solution prepared by dissolving an electrolyte salt as the solute in an aqueous solvent. The aqueous solvent is a solvent containing 50% or more water by volume, for example. The aqueous solvent may also be pure water.

The aqueous electrolyte may also be an aqueous gel composite electrolyte containing an aqueous electrolytic solution and a polymer material. The polymer material may be, for example, polyvinylidene fluoride (PVDF), polyacrylonitrile (PAN), or polyethylene oxide (PEO).

The aqueous electrolyte preferably contains 1 mol or greater of aqueous solvent per 1 mol of the salt as the solute. In an even more preferably aspect, the aqueous electrolyte contains 3.5 mol or greater of aqueous solvent per 1 mol of the salt as the solute.

That the aqueous electrolyte contains water can be confirmed by gas chromatography-mass spectrometry (GC-MS) measurement. Also, the salt concentration and the amount of water contained in the aqueous electrolyte can be computed by measurement using inductively coupled plasma (ICP) emission spectroscopy or the like, for example. By measuring out a prescribed amount of the aqueous electrolyte and computing the contained salt concentration, the molar concentration (mol/L) can be computed. Also, by measuring the specific gravity of the aqueous electrolyte, the number of moles of the solute and the solvent can be computed.

The aqueous electrolyte is prepared by dissolving the electrolyte salt into the aqueous solvent at a concentration from 1 to 12 mol/L for example.

To suppress electrolysis of the aqueous electrolyte, LiOH, $Li_2SO_4$, or the like can be added to adjust the pH. The pH is preferably from 3 to 13, and more preferably from 4 to 12.

(4) Separator

The separator is formed of, for example, a porous film containing polyethylene (polyethylene; PE), polypropylene (polypropylene; PP), cellulose, or polyvinylidene fluoride (PVdF), or a synthetic resin nonwoven fabric. From the viewpoint of safety, it is preferable to use a porous film formed from polyethylene or polypropylene. This is because these porous films can be melted at a predetermined temperature to interrupt the current.

(5) Container Member

As the container member, for example, a container made of laminate film or a container made of metal may be used.

The thickness of the laminate film is, for example, 0.5 mm or less, and preferably 0.2 mm or less.

As the laminate film, used is a multilayer film including multiple resin layers and a metal layer sandwiched between the resin layers. The resin layer may include, for example, a polymeric material such as polypropylene (PP), polyethylene (PE), nylon, or polyethylene terephthalate (PET). The metal layer is preferably made of aluminum foil or an aluminum alloy foil, so as to reduce weight. The laminate film may be formed into the shape of a container member, by heat-sealing.

The wall thickness of the metal container is, for example, 1 mm or less, more preferably 0.5 mm or less, and still more preferably 0.2 mm or less.

The metal case is made, for example, of aluminum or an aluminum alloy. The aluminum alloy preferably contains elements such as magnesium, zinc, or silicon. If the aluminum alloy contains a transition metal such as iron, copper, nickel, or chromium, the content thereof is preferably 100 ppm by mass or less.

The shape of the container member is not particularly limited. The shape of the container member may be, for example, flat (thin), square, cylinder, coin, or button-shaped. The container member may be appropriately selected depending on battery size and use of the battery.

(6) Negative Electrode Terminal

The negative electrode terminal may be made of a material that is electrochemically stable at the potential at which Li is inserted into and extracted from the above-described negative electrode active material, and has electrical conductivity. Specific examples of the material for the negative electrode terminal include copper, nickel, stainless steel, aluminum, and aluminum alloy containing at least one element selected from the group consisting of Mg, Ti, Zn, Mn, Fe, Cu, and Si. Aluminum or aluminum alloy is preferred as the material for the negative electrode terminal. The negative electrode terminal is preferably made of the same material as the negative electrode current collector, in order to reduce the contact resistance with the negative electrode current collector.

(7) Positive Electrode Terminal

The positive electrode terminal may be made of, for example, a material that is electrically stable in the potential range of 3 V to 4.5 V (vs. $Li/Li^+$) relative to the redox potential of lithium, and has electrical conductivity. Examples of the material for the positive electrode terminal include aluminum and an aluminum alloy containing one or more selected from the group consisting of Mg, Ti, Zn, Mn, Fe, Cu, and Si. The positive electrode terminal is preferably made of the same material as the positive electrode current collector, in order to reduce contact resistance with the positive electrode current collector.

(8) Form of Secondary Battery

The secondary battery according to the present embodiment can be used in various forms such as a square shape, a cylindrical shape, a flat type, a thin type, and a coin type. Further, the secondary battery may have a bipolar structure. The secondary battery having the bipolar structure has an advantage that a plurality of cells in series can be produced as one cell. The secondary battery may be a stacked secondary battery in which a sheet-like negative electrode and a sheet-like positive electrode are alternately stacked with a separator interposed therebetween.

Next, the secondary battery according to the embodiment will be described more specifically with reference to the drawings.

FIG. 12 is a partially cutaway perspective view schematically illustrating an example of the secondary battery according to the embodiment. FIG. 13 is an enlarged cross-sectional view of a part B of the secondary battery illustrated in FIG. 12.

The secondary battery 100 illustrated in FIGS. 12 and 13 includes a stacked electrode group 1 illustrated in FIGS. 12 and 13, a container member 2 illustrated in FIG. 12, and an electrolyte (not illustrated). The electrode group 1 and the electrolyte are stored in the container member 2. The electrolyte is held in the electrode group 1.

The container member 2 is made of a laminate film including two resin layers and a metal layer intervening therebetween.

As shown in FIG. 13, the electrode group 1 is a laminated electrode group. The laminated electrode group 1 has a structure in which a negative electrode 3 and a positive electrode 5 are alternately laminated with a separator 4 intervening therebetween.

The electrode group 1 includes a plurality of the negative electrodes 3. The plurality of negative electrodes 3 are each provided with a negative electrode current collector 3a and a negative electrode active material mixture layer 3b carried on both sides of the negative electrode current collector 3a. Further, the electrode group 1 includes a plurality of the positive electrodes 5. The plurality of positive electrodes 5 are each provided with a positive electrode current collector 5a and a positive electrode active material mixture layer 5b carried on both sides of the positive electrode current collector 5a.

The negative electrode current collector 3a of each negative electrode 3 includes a portion 3c on one side where the negative electrode active material mixture layer 3b is not carried on any surfaces. This portion 3c acts as a negative electrode tab. As shown in FIG. 13, the portion 3c acting as the negative electrode tab does not overlap the positive electrode 5. In addition, a plurality of negative electrode tabs (portion 3c) is electrically connected to a belt-shaped negative electrode terminal 6. A tip of the belt-shaped negative electrode terminal 6 is drawn outward from a container member 2.

In addition, although not shown, the positive electrode current collector 5a of each positive electrode 5 includes a portion on one side where the positive electrode active material mixture layer 5b is not carried on any surfaces. This portion acts as a positive electrode tab. The positive electrode tab does not overlap the negative electrode 3. In addition, the positive electrode tab is positioned on the opposite side of the electrode group 1 with respect to the negative electrode tab (portion 3c). The positive electrode tab is electrically connected to a belt-shaped positive electrode terminal 7. A tip of the belt-shaped positive electrode terminal 7 is positioned on the opposite side to the negative electrode terminal 6 and is drawn outward from the container member 2.

FIG. 14 illustrates another example of the stacked electrode group. FIG. 14 is an exploded perspective view of the electrode group. This electrode group includes a zigzag-folded separator 4, a strip-shaped positive electrode 5, and a strip-shaped negative electrode 3. A negative electrode $3_1$ is stacked on the uppermost layer of the separator 4. A positive electrode 51, a negative electrode $3_2$, a positive electrode 52, and a negative electrode $3_3$ are inserted between portions of the folded separator 4 in order from the top.

<Method of Manufacturing Secondary Battery>

The secondary battery according to the embodiment can be manufactured, for example, by a method described below.

One or more negative electrodes and one or more positive electrodes are produced by the method described above. Separately, one or more belt-shaped separators are prepared. For example, as described with reference to FIGS. 12 and 13, the negative electrode and the positive electrode are alternately stacked with the separator interposed therebetween to produce a stacked electrode group.

The produced electrode group is incorporated into the container member made of a multilayer film including a plurality of resin layers and a metal layer interposed between the resin layers, and is subjected to a drying step. Thereafter, for example, a liquid electrolyte is injected in the container member, and the container member is sealed by heat sealing to produce a secondary battery before the initial charging.

Next, in a state where the secondary battery before the initial charging is restrained, the secondary battery is subjected to the initial charging. A restraint mode of the secondary battery according to an example will be described with reference to FIGS. 15 to 17. When the secondary battery is subjected to the initial charging, lithium ions are inserted into the niobium-titanium composite oxide contained in the negative electrode active material, and the negative electrode mixture layer expands. As a result, the negative electrode mixture layer expands in both the thickness direction of the layer and the in-plane direction of the layer. However, by restraining the main surface of the stacked electrode group from the outside of the container member of the secondary battery, the expansion width in the thickness direction can be controlled to a predetermined value or less. As a result, the negative electrode mixture layer cannot expand beyond the restricted width in the thickness direction, and thus the expansion volume thereof extends in the in-plane direction. In this way, the first protrusion satisfying the above-described formula (1) can be formed on at least a part of the end portion of the negative electrode mixture layer.

FIG. 15 is a plan view schematically illustrating a stack 70 including the secondary battery before the initial charging and a restraining jig 60. FIG. 16 is a cross-sectional view taken along line XVI-XVI, illustrating the stack 70 illustrated in FIG. 15. FIG. 17 is a cross-sectional view schematically illustrating a state after the secondary battery included in the stack according to FIG. 16 is initially charged.

As one method of restraining the secondary battery 100, for example, as illustrated in FIGS. 15 and 16, there is a method of restraining the secondary battery 100 from the outside of the secondary battery 100 having a flat rectangular parallelepiped shape using two restraining jigs 60a and 60b. The secondary battery 100 illustrated in FIG. 16 is, for example, the secondary battery including the stacked electrode group 1 described with reference to FIGS. 12 and 13. However, FIG. 16 does not illustrate a negative electrode terminal 6 and a positive electrode terminal 7.

The stack 70 includes the secondary battery 100, two or more restraining jigs 60a and 60b, two or more bake plates 61a and 61b, two or more restraining units 62, and two or more spacers 63a and 63b.

In FIGS. 15 to 17, the secondary battery 100 is restrained by the restraining jigs 60a and 60b via the bake plates 61a and 61b. The secondary battery 100 having a flat rectangular parallelepiped shape has two main surfaces, that is, a front surface 101 and a back surface 102. The front surface 101 and the back surface 102 face the bake plates 61a and 61b, respectively.

Examples of the restraining jigs 60a and 60b include a metal plate made of metal such as stainless steel (SUS) or aluminum. In the stack 70 illustrated in FIGS. 15 to 17, the two restraining jigs 60 sandwich the secondary battery 100 via the bake plates 61. On the other hand, the two restraining jigs 60 are fixed by the spacers 63a and 63b so as to keep a predetermined interval between the two restraining jigs 60. A method of fixing the restraining jigs 60a and 60b to each other is not particularly limited, but here, as an example, the method is performed by tightening the restraining units 62 such as a bolt and a nut. The restraining jigs 60a and 60b are fixed by the restraining units 62 toward each other with the spacers 63a and 63b or the like interposed therebetween.

The spacers may be, for example, rigid bodies such as Bakelite made of a phenol resin or the like, or elastic bodies made of an elastomer or the like. In the restraining jigs 60a and 60b, through holes into which the restraining units 62 such as bolts to be used with nuts can be inserted can be provided at predetermined positions.

In FIGS. 15 and 16 illustrating a state before the initial charging, the secondary battery 100 is disposed on the bake plate 61b. Therefore, the back surface 102 of the secondary battery 100 is in contact with the bake plate 61b. Meanwhile, the front surface 101 of the secondary battery 100 and the bake plate 61a are separated from each other. The thickness of the secondary battery 100 before the initial charging is defined by a distance tB between the front surface 101 and the back surface 102. Although not illustrated in FIG. 16, the total thickness of at least one negative electrode mixture layer present in the secondary battery 100 before the initial charging is defined as tC.

In the stack 70 before the initial charging, the distance between the main surface of the one bake plate 61a and the main surface of the other bake plate 61b is set to a numerical value obtained by adding the above-described tB to a numerical value tCx, that is, is set to tB+tCx. Where x is within the range of more than 0% and 25% or less. The tCx is one when the negative electrode mixture layer 3b having the total thickness tC expands in the thickness direction at a rate of a thickness coefficient x %. The numerical value tB+tCx is also referred to as a "restrained thickness". The thickness coefficient x may be in the range of 5% or more and 25% or less, in the range of 5% or more and 20% or less, or in the range of 5% or more and 15% or less.

When the secondary battery 100 is initially charged, at least one negative electrode mixture layer present in the secondary battery 100 expands in the thickness direction. Due to this expansion, the thickness tB of the secondary battery 100 increases to a thickness tB' as illustrated in FIG. 17. The thickness tB' takes, for example, the same or substantially the same value as the restrained thickness tB+tCx. In the secondary battery 100 after the expansion, the front surface 101 may be in contact with the bake plate 61a, and the back surface 102 may be in contact with the bake plate 61b. However, even if the front surface 101 and the back surface 102 of the secondary battery 100 after the initial charging are not in contact with the bake plates, the negative electrode mixture layer may have the first protrusion.

The thickness tB of the secondary battery 100 before the initial charging is, for example, in the range of 400 μm to 60,000 μm. The total thickness tC of the at least one negative electrode mixture layer present in the secondary battery 100 before the initial charging is, for example, in the range of 50 μm to 30,000 μm. If tB and tC are too small, the energy density may be too small, which is not preferable. If tB and tC are too large, the temperature non-uniformity in the secondary battery increases, and the capacity retention rate may decrease, which is not preferable.

The restrained thickness tB+tCx is, for example, in the range of 400 μm to 67,500 μm. If the thickness coefficient x or the restrained thickness tB+tCx is too small, the secondary battery may be damaged, which is not preferable. In this case, the size of the protrusion from the current collector end surface of the negative electrode mixture layer tends to exceed 1 mm, which is not preferable. When the thickness coefficient x or the restrained thickness tB+tCx is too large, the effect of restraining the secondary battery is hardly exhibited. That is, since the margin of expansion in the thickness direction of the negative electrode mixture layer is too large, the negative electrode mixture layer may be unlikely to expand in the in-plane direction.

The protrusion lengths of the first protrusion to the fourth protrusion and the shapes of the protrusions can be controlled by compositely adjusting parameters such as the thickness of the negative electrode current collector, the thickness and the electrode density of the negative electrode mixture layer, and the thickness coefficient x.

For example, by reducing the value of the thickness coefficient x, the expansion of the negative electrode mixture layer 3b in the in-plane direction at the time of the initial charging can be promoted, and thus, for example, the protrusion lengths of the first protrusion to the fourth protrusion can be increased. On the other hand, by increasing the value of the thickness coefficient x, the expansion of the negative electrode mixture layer 3b in the in-plane direction at the time of the initial charging can be suppressed, and thus, for example, the protrusion lengths of the first protrusion to the fourth protrusion can be reduced.

In FIGS. 15 to 17, the method of restraining the secondary battery 100 with the predetermined restrained thickness using the spacers, that is, the restraining method by the constant dimension restraint has been described. However, the secondary battery 100 according to the embodiment may be restrained by constant pressure restraint as exemplified in FIG. 18. In the constant pressure restraint, fastening torque is controlled using restraining units such as a bolt and a nut instead of controlling the restrained thickness tB+tCx using the spacers.

A stack 70 illustrated in FIG. 18 has the same configuration as the stack described with reference to FIGS. 15 and 16, except that the stack 70 illustrated in FIG. 18 does not include a spacer. In the stack 70 illustrated in FIG. 18, the front surface 101 and the back surface 102 of the secondary battery 100 before the initial charging are in contact with the bake plates 61a and 61b, respectively. In the constant pressure restraint, the thickness coefficient x may be 0 as described above. Even when the thickness coefficient x is 0, the restraint force applied to the main surface of the secondary battery (the main surface of the negative electrode mixture layer) can be controlled by controlling the magnitude of the fastening torque. That is, the length of the protrusion generated by the expansion of the negative electrode mixture layer can be controlled. If the fastening torque is excessively increased, the secondary battery 100 is damaged, which is not preferable.

Even in the constant pressure restraint, the thickness coefficient x may not be 0. In this case, the thickness coefficient x may be in the range of 0%≤x≤25%.

As each of the bake plates 61, for example, a plate obtained by stacking a resin such as a phenol resin on a base material such as paper or cloth can be used. The thickness of each of the bake plates 61 is, for example, in the range of 1 mm to 40 mm.

By interposing the bake plates 61 between the metal plates as the restraining jigs and the secondary battery, deformation of the metal plates can be suppressed when the metal plates are fixed to each other. Therefore, uniform pressure can be applied to the secondary battery 100, i.e., the entire flat portion of the stacked electrode group 1 housed in the container member 2.

An example of dimensions will be described for a case where the secondary battery according to the embodiment has a flat rectangular parallelepiped shape. For example, the width of the secondary battery 100 (container member 2) illustrated in FIG. 16 in the X-axis direction is in the range of, for example, 5 cm to 100 cm. The length of the secondary battery 100 (container member 2) in the Y-axis direction is in the range of, for example, 5 cm to 100 cm.

Conditions for the initial charging are not particularly limited, and are, for example, the following conditions. The secondary battery is charged at a current value of 0.1 C to 2.0 C at 25° C. until the battery voltage reaches 2.0 V to 3.0 V. Note that the current value at the time of the charging is indicated in a unit representing, as 1 C, a current value at which the SOC (state of charge) of the secondary battery becomes 0% in one hour when the secondary battery is discharged from the SOC (state of charge) of 100%. After the initial charging, aging may be performed as necessary.

According to the first embodiment, a secondary battery is provided. The secondary battery includes a negative electrode, a positive electrode, and an electrolyte. The negative electrode includes a negative electrode current collector containing aluminum, and a negative electrode mixture layer stacked on the negative electrode current collector and having a front surface and a back surface. The negative electrode current collector has a thickness of 8 μm or more and 18 μm or less. The negative electrode current collector comprises a first current collector end surface extending along a stacking direction in which the negative electrode mixture layer is stacked on the negative electrode current collector. The negative electrode mixture layer comprises a niobium-titanium composite oxide as a negative electrode active material, and a first protrusion protruding from the first current collector end surface along a first direction orthogonal to the stacking direction. A protrusion length A1 of the first protrusion satisfies 0 mm<A1≤1.0 mm. In the negative electrode included in the secondary battery according to the embodiment, the front surface or the back surface of the negative electrode current collector is covered with the negative electrode mixture layer in the vicinity of the end portion of the negative electrode current collector. Therefore, an internal short circuit between the negative electrode and the positive electrode hardly occurs. As a result, according to the secondary battery according to the embodiment, it is possible to reduce the frequency of a defect caused by self-discharge.

Second Embodiment

According to the second embodiment, a battery module is provided. The battery module according to the second embodiment comprises a plurality of the secondary batteries according to the first embodiment.

In the battery module according to the embodiment, individual unit cells may be electrically connected in series or in parallel, or may be arranged in combination of series connection and parallel connection.

Next, an example of the battery module according to the embodiment will be described with reference to the drawings.

FIG. 19 is a perspective view schematically showing an example of the battery module according to the embodiment. The battery module 200 shown in FIG. 19 includes five unit cells 100a to 100e, four bus bars 21, a positive electrode-side lead 22, and a negative electrode-side lead 23. Each of the five unit cells 100a to 100e is the secondary battery according to the first embodiment.

The busbar 21 connects a negative electrode terminal 6 of a single unit cell 100a to a positive electrode terminal 7 of an adjacently positioned unit cell 100b. In this way, the five unit cells 100a to 100e are connected in series by the four bus bars 21. That is, the battery module 200 shown in FIG. 19 is a battery module of five in-series connection. Although an example is not illustrated, in a battery module containing a plurality of unit cells electrically connected in parallel, the plurality of unit cells may be electrically connected by connecting the plurality of negative electrode terminals to each other with busbars and also connecting the plurality of positive electrode terminals to each other with busbars, for example.

The positive electrode terminal 7 of at least one battery among the five unit cells 100a to 100e is electrically connected to a positive electrode lead 22 for external connection. Also, the negative electrode terminal 6 of at least one battery among the five unit cells 100a to 100e is electrically connected to a negative electrode lead 23 for external connection.

A battery module according to a second embodiment includes the secondary battery according to the first embodiment. Therefore, according to the battery module according to the second embodiment, the frequency of a defect caused by self-discharge can be reduced.

Third Embodiment

According to the third embodiment, a battery pack is provided. The battery pack includes the battery module according to the second embodiment. The battery pack may also comprise a single secondary battery according to the first embodiment instead of the battery module according to the second embodiment.

The battery pack according to the embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the embodiment may further include an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the embodiment will be described with reference to the drawings.

FIG. 20 is an exploded perspective view schematically showing an example of the battery pack according to the embodiment. FIG. 21 is a block diagram showing an example of an electric circuit of the battery pack shown in FIG. 20.

A battery pack 300 shown in FIGS. 20 and 21 includes a housing container 31, a lid 32, protective sheets 33, a battery module 200, a printed wiring board 34, wires 35, and an insulating plate (not shown).

A housing container 31 shown in FIG. 20 is a bottomed-square-shaped container having a rectangular bottom surface. The housing container 31 is configured to house protective sheet 33, a battery module 200, a printed wiring board 34, and wires 35. A lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural unit cells 100, a positive electrode-side lead 22, a negative electrode-side lead 23, and an adhesive tape 24.

At least one in the plurality of unit cells 100 is a secondary battery according to the first embodiment. Each unit cell 100 in the plurality of unit cells 100 is electrically connected in series, as shown in FIG. 21. The plurality of unit cells 100 may alternatively be electrically connected in parallel, or connected in a combination of in-series connection and in-parallel connection. If the plurality of unit cells 100 is connected in parallel, the battery capacity increases as compared to a case where they are connected in series.

The adhesive tape 24 fastens the plural unit cells 100. The plural unit cells 100 may be fixed using a heat-shrinkable tape in place of the adhesive tape 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural unit cells 100.

One terminal of a positive electrode lead 22 is connected to a battery module 200. One terminal of the positive electrode lead 22 is electrically connected to the positive electrode of one or more unit cells 100. One terminal of a negative electrode lead 23 is connected to the battery module 200. One terminal of the negative electrode lead 23 is electrically connected to the negative electrode of one or more unit cells 100.

The printed wiring board 34 is arranged on the inner surface of the housing container 31 along the short side direction. The printed wiring board 34 includes a positive electrode connector 342, a negative electrode connector 343, a thermistor 345, a protective circuit 346, wirings 342a and 343a, an external power distribution terminal 350, a plus-side wire (positive-side wire) 348a, and a minus-side wire (negative-side wire) 348b. One principal surface of the printed wiring board 34 faces one side surface of the battery module 200. An insulating plate (not shown) is disposed in between the printed wiring board 34 and the battery module 200.

The other terminal 22a of the positive electrode lead 22 is electrically connected to a positive electrode connector 342. The other terminal 23a of the negative electrode lead 23 is electrically connected to a negative electrode connector 343.

The thermistor 345 is fixed to one principal surface of the printed wiring board 34. The thermistor 345 detects the temperature of each unit cell 100 and transmits detection signals to the protective circuit 346.

The external power distribution terminal 350 is fixed to the other principal surface of the printed wiring board 34. The external power distribution terminal 350 is electrically connected to device(s) that exists outside the battery pack 300. The external power distribution terminal 350 includes a positive side terminal 352 and a negative side terminal 353.

The protective circuit 346 is fixed to the other principal surface of the printed wiring board 34. The protective circuit 346 is connected to the positive side terminal 352 via the plus-side wire 348a. The protective circuit 346 is connected to the negative side terminal 353 via the minus-side wire 348b. In addition, the protective circuit 346 is electrically connected to the positive electrode connector 342 via the wiring 342a. The protective circuit 346 is electrically connected to the negative electrode connector 343 via the wiring 343*a*. Furthermore, the protective circuit 346 is electrically connected to each unit cell 100 in the plurality of unit cells 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheet 33 is made of, for example, resin or rubber.

The protective circuit 346 controls charging and discharging of the plurality of unit cells 100. The protective circuit 346 is also configured to cut off electric connection between the protective circuit 346 and the external power distribution terminal 350 (the positive side terminal 352 and the negative side terminal 353) to the external devices, based on detection signals transmitted from the thermistor 345 or detection signals transmitted from each unit cell 100 or the battery module 200.

An example of the detection signal transmitted from the thermistor 345 is a signal indicating that the temperature of the unit cell(s) 100 is detected to be a predetermined temperature or more. An example of the detection signal transmitted from each unit cell 100 or the battery module 200 is a signal indicating detection of over-charge, over-discharge, and overcurrent of the unit cell(s) 100. When detecting over-charge or the like for each of the unit cells 100, the battery voltage may be detected, or a positive electrode potential or negative electrode potential may be detected. In the latter case, a lithium electrode to be used as a reference electrode may be inserted into each unit cell 100.

Note, that as the protective circuit 346, a circuit included in a device (for example, an electronic device or an automobile) that uses the battery pack 300 as a power source may be used.

As described above, the battery pack 300 includes the external power distribution terminal 350. Hence, the battery pack 300 can output current from the battery module 200 to an external device and input current from an external device to the battery module 200 via the external power distribution terminal 350. In other words, when using the battery pack 300 as a power source, the current from the battery module 200 is supplied to an external device via the external power distribution terminal 350. When charging the battery pack 300, a charge current from an external device is supplied to the battery pack 300 via the external power distribution terminal 350. If the battery pack 300 is used as an onboard battery, the regenerative energy of the motive force of a vehicle can be used as the charge current from the external device.

Note that the battery pack 300 may include a plurality of battery modules 200. In this case, the plurality of battery modules 200 may be connected in series, in parallel, or connected in a combination of in-series connection and in-parallel connection. The printed wiring board 34 and the wires 35 may be omitted. In this case, the positive electrode lead 22 and the negative electrode lead 23 may be used as the positive side terminal and the negative side terminal of the external power distribution terminal, respectively.

Such a battery pack is used for, for example, an application required to have the excellent cycle performance when a large current is taken out. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

A battery pack according to a third embodiment includes the secondary battery according to the first embodiment or the battery module according to the second embodiment. Therefore, according to the third embodiment, it is possible to provide a battery pack including a secondary battery or a battery module with a low frequency of a defect caused by self-discharge.

Fourth Embodiment

According to the fourth embodiment, a vehicle is provided. The vehicle includes the battery pack according to the third embodiment.

In a vehicle according to the fourth embodiment, the battery pack is configured, for example, to recover regenerative energy from motive force of the vehicle. The vehicle may include a mechanism configured to convert kinetic energy of the vehicle into regenerative energy.

Examples of the vehicle according to the fourth embodiment include two- to four-wheeled hybrid electric automobiles, two- to four-wheeled electric automobiles, electric assist bicycles, and railway cars.

In the vehicle according to the fourth embodiment, the installing position of the battery pack is not particularly limited. For example, the battery pack may be installed in the engine compartment of the vehicle, in rear parts of the vehicle, or under seats.

A plurality of battery packs is loaded on the vehicle according to the fourth embodiment. In this case, the batteries included in each of the battery packs may be electrically connected to each other in series, in parallel, or in a combination of in-series connection and in-parallel connection. For example, in the case where each battery pack includes a battery module, the battery modules may be electrically connected to each other in series, in parallel, or in a combination of in-series connection and in-parallel connection. Alternatively, in the case where each battery pack includes a single battery, each of the batteries may be electrically connected to each other in series, in parallel, or in a combination of in-series connection and in-parallel connection.

Next, one example of the vehicle according to the fourth embodiment will be described with reference to the drawings.

FIG. 22 is a partially transparent diagram schematically illustrating one example of a vehicle according to the embodiment.

A vehicle 400 illustrated in FIG. 22 includes a vehicle body 40 and a battery pack 300 according to the embodiment. In the example illustrated in FIG. 22, the vehicle 400 is a four-wheeled automobile.

A plurality of the battery packs 300 may be loaded on the vehicle 400. In this case, the batteries included in the battery packs 300 (for example, unit cell or battery modules) may be connected in series, connected in parallel, or connected in a combination of in-series connection and in-parallel connection.

In FIG. 22, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

Next, an embodiment of the vehicle according to the fourth embodiment will be described with reference to FIG. 23.

FIG. 23 is a diagram schematically illustrating one example of a control system related to an electrical system in the vehicle according to the fourth embodiment. The vehicle 400 illustrated in FIG. 23 is an electric automobile.

The vehicle 400, shown in FIG. 23, includes a vehicle body 40, a vehicle power source 41, a vehicle ECU (electric control unit) 42, which is a master controller of the vehicle power source 41, an external terminal (an external power connection terminal or external power distribution terminal) 43, an inverter 44, and a drive motor 45.

The vehicle 400 includes the vehicle power source 41, for example, in the engine compartment, in the rear sections of the automobile body, or under a seat. In FIG. 23, the position of the vehicle power source 41 installed in the vehicle 400 is schematically shown.

The vehicle power source 41 includes plural (for example, three) battery packs 300a, 300b and 300c, a battery management unit (BMU) 411, and a communication bus 412.

A battery pack 300a is provided with a battery module 200a and a battery module monitoring apparatus 301a (for example, voltage temperature monitoring (VTM)). A battery pack 300b is provided with a battery module 200b and a battery module monitoring apparatus 301b. A battery pack 300c is provided with a battery module 200c and a battery module monitoring apparatus 301c. The battery packs 300a to 300c are battery packs similar to the battery pack 300 described earlier, and the battery modules 200a to 200c are battery modules similar to the battery module 200 described earlier. The battery modules 200a to 200c are electrically connected in series. The battery packs 300a, 300b, and 300c are removable independently of each other, and each can be replaced with a different battery pack 300.

Each of the battery modules 200a to 200c includes plural battery cells connected in series. At least one of the plural battery cells is the secondary battery according to the first embodiment. The battery modules 200a to 200c each perform charging and discharging via a positive electrode terminal 413 and a negative electrode terminal 414.

A battery management apparatus 411 communicates with the battery module monitoring apparatus 301a to 301c, and collects information related to the voltage, temperature, and the like for each of the unit cells 100 included in the battery modules 200a to 200c included in the vehicle power source 41. With this arrangement, the battery management apparatus 411 collects information related to the maintenance of the vehicle power source 41.

The battery management apparatus 411 and the battery module monitoring apparatus 301a to 301c are connected via a communication bus 412. In the communication bus 412, a set of communication wires are shared with a plurality of nodes (the battery management apparatus 411 and one or more of the battery module monitoring apparatus 301a to 301c). The communication bus 412 is a communication bus, for example, configured in accordance with the controller area network (CAN) standard.

The battery module monitoring units 301a to 301c measure a voltage and a temperature of each battery cell in the battery modules 200a to 200c based on commands from the battery management unit 411. It is possible, however, to measure the temperatures only at several points per battery module, and the temperatures of all of the battery cells need not be measured.

The vehicle power source 41 can also have an electromagnetic contactor (for example, a switch apparatus 415 illustrated in FIG. 23) that switches the presence or absence of an electrical connection between a positive electrode terminal 413 and a negative electrode terminal 414. The switch apparatus 415 includes a pre-charge switch (not illustrated) that turns on when the battery modules 200a to 200c are charged, and a main switch (not illustrated) that turns on when the output from the battery modules 200a to 200c is supplied to the load. Each of the pre-charge switch and the main switch is provided with a relay circuit (not illustrated) that switches on or off according to a signal supplied to a coil disposed near a switching element. The electromagnetic contactor such as the switch apparatus 415 is controlled according to of control signals from the battery management apparatus 411 or the vehicle ECU 42 that controls the entire operation of the vehicle 400.

The inverter 44 converts an inputted direct current voltage to a three-phase alternate current (AC) high voltage for driving a motor. Three-phase output terminal(s) of the inverter 44 is (are) connected to each three-phase input terminal of the drive motor 45. The inverter 44 is controlled based on control signals from the battery management apparatus 411, or the vehicle ECU 42 which controls the entire operation of the vehicle. By controlling the inverter 44, the output voltage from the inverter 44 is adjusted.

The drive motor 45 is rotated by electric power supplied from the inverter 44. The driving force produced by the rotation of the drive motor 45 is transmitted to an axle (or axles) and drive wheels W via a differential gear unit for example.

The vehicle 400 also includes a regenerative brake mechanism (regenerator), though not shown. The regenerative brake mechanism rotates the drive motor 45 when the vehicle 400 is braked, and converts kinetic energy into regenerative energy, as electric energy. The regenerative energy, recovered in the regenerative brake mechanism, is inputted into the inverter 44 and converted to direct current. The converted direct current is inputted into the vehicle power source 41.

One terminal of a connection line L1 is connected to the negative electrode terminal 414 of the vehicle power source 41. The other terminal of the connection line L1 is connected to a negative electrode input terminal 417 of the inverter 44. On the connection line L1, a current detector (current detection circuit) 416 is provided inside the battery management apparatus 411 between the negative electrode terminal 414 and the negative electrode input terminal 417.

One terminal of a connection line L2 is connected to the positive electrode terminal 413 of the vehicle power source 41. The other terminal of the connection line L2 is connected to a positive electrode input terminal 418 of the inverter 44. On the connection line L2, the switch apparatus 415 is provided between the positive electrode terminal 413 and the positive electrode input terminal 418.

The external terminal 43 is connected to the battery management apparatus 411. The external terminal 43 can be connected to, for example, an external power source.

The vehicle ECU 42 cooperatively controls the vehicle power source 41, the switch apparatus 415, the inverter 44, and the like together with other management apparatus and control apparatus, including the battery management apparatus 411, in response to operation input from a driver or the like. By the cooperative control by the vehicle ECU 42 and the like, the output of electric power from the vehicle power source 41, the charging of the vehicle power source 41, and the like are controlled, and the vehicle 400 is managed as a whole. Data related to the maintenance of the vehicle power source 41, such as the remaining capacity of the vehicle power source 41, is transferred between the battery management apparatus 411 and the vehicle ECU 42 by a communication line.

A vehicle according to a fourth embodiment comprises the battery pack according to the third embodiment. Therefore, according to the fourth embodiment, it is possible to provide a vehicle including a battery pack with a low frequency of a defect caused by self-discharge.

EXAMPLES

Examples will be described below, but the embodiments are not limited to the examples described below.

Example 1

In Example 1, a secondary battery was produced according to the following procedure.
<Production of Positive Electrode>

90 mass % of $LiNi_{0.5}Co_{0.2}Mn_{0.3}O_2$ composite oxide having an average primary particle size of 2 μm as a positive electrode active material, 5 mass % of graphite powder as an electro-conductive agent, and 5 mass % of PVdF as a binder were blended and dispersed in an N-methyl-2-pyrrolidone (NMP) solvent to prepare a slurry for forming a positive electrode mixture layer. Each of the above blending amounts is a mass with respect to the mass of the positive electrode mixture layer. The prepared slurry was applied to both surfaces of an aluminum alloy foil (with a purity of 99.3%) having a thickness of 15 μm and was dried to obtain a stack. The stack was pressed to produce a positive electrode in which the positive electrode mixture layer on one side had an electrode density of 3.2 $g/cm^3$.
<Production of Negative Electrode>

As a negative electrode active material, a monoclinic $Nb_2TiO_7$(NTO) powder having an average particle size D50 of 5 μm was prepared. As materials of the mixture layer, the active material particles, an acetylene black powder as an electro-conductive agent, a carboxymethylcellulose (CMC) sodium salt powder as a thickener, and styrene-butadiene rubber (SBR) as a binder were used. The compounding ratio of these materials was NTO:acetylene black:CMC:SBR=93: 5:1:1 in terms of a mass ratio. These materials were mixed in the following order while pure water as a solvent was stirred to prepare a slurry. Carboxymethylcellulose sodium salt is dissolved in pure water, and then SBR is further mixed to obtain a dispersion. Acetylene black was dispersed in this dispersion, and finally an NTO powder was dispersed and stirred to obtain a slurry. The obtained slurry was applied to both surfaces of an aluminum alloy foil (with a purity of 99.3%) having a thickness of 15 μm to obtain a coating film, and the coating film was dried to obtain a stack including a current collector and a mixture layer. The stack was pressed to produce a negative electrode having an electrode density of 2.6 $g/cm^3$.
<Preparation of Electrolyte>

A mixed solvent of propylene carbonate and diethyl carbonate in a volume ratio of 1:2 was prepared. Next, $LiPF_6$ was dissolved in the mixed solvent at a concentration of 1.2 M to prepare a liquid nonaqueous electrolyte.
<Production of Secondary Battery>

A plurality of positive electrodes and a plurality of negative electrodes produced by the above procedure were prepared, and separators made of a nonwoven fabric having a thickness of 20 μm were interposed between the positive electrodes and the negative electrodes, and the positive electrodes, the negative electrodes, and the separators were stacked to produce a stacked electrode group.

The produced stacked electrode group was incorporated into a container member formed of a multilayer film including a plurality of resin layers and a metal layer interposed between the resin layers, and was vacuum-dried under an environment of 120° C. for 8 hours. Thereafter, the electrolytic solution prepared in advance was injected in the container member, and the container member was sealed by heat sealing to produce a secondary battery before the initial charging.
<Attachment of Restraining Jig>

A restraining jig was attached to the produced uncharged secondary battery by the method described with reference to FIGS. 15 and 16. Specifically, both surfaces of the secondary battery having a flat rectangular parallelepiped shape were sandwiched between stainless steel plates with a bake plate interposed therebetween, and a spacer was further interposed between the stainless steel plates. Then, the stainless steel plates were fastened to each other using a screw to produce a stack including the secondary battery restrained by constant dimension restraint.

The thickness tB of the secondary battery not initially charged was 1740 μm. The total thickness tC of the plurality of negative electrode mixture layers existing in the secondary battery before the initial charging was 580 μm. The restrained thickness tB+tCx was adjusted to 1850 μm by setting the thickness coefficient x to 19.0%.
<Initial Charging/Discharging and Degassing Treatment>

The stack including the restrained secondary battery was placed in a thermostatic bath set to a bath temperature of 25° C. In the thermostatic bath, the battery was charged at a constant current of 0.2 C until the battery voltage reached 3.00 V, and after the battery voltage reached 3.00 V, constant voltage charging was performed. The total charging time was 10 hours. The battery after the charging was maintained in a resting state for 10 minutes. Thereafter, the secondary battery was discharged at a constant current of 0.2 C until the battery voltage reached 1.5 V. The battery capacity was 1.5 Ah.

Thereafter, the battery was charged at a constant current of 1 C. After the battery voltage reached 2.25 V, constant voltage charging was performed. When the charging current reached 0.05 C, the charging was terminated. Thereafter, the restraint of the cell was released, and a degassing treatment was performed. In this way, the secondary battery according to Example 1 was produced.

Examples 2 and 3

A secondary battery was produced in the same manner as in Example 1, except that the thickness coefficient x at the time of restraining the secondary battery was changed as shown in the following Table 2.

Examples 4 to 6

A secondary battery was produced in the same manner as in Example 1, except that the electrode density of each of the negative electrode mixture layer was changed to 2.8 $g/cm^3$ and the restraint conditions were changed as shown in Table 2.

Example 7

A secondary battery was produced in the same manner as in Example 1, except that the electrode density of each of the positive electrode mixture layer was changed to 3.4 $g/cm^3$ and the restraint conditions were changed as shown in Table 2.

Examples 8 and 9

A secondary battery was produced in the same manner as in Example 1, except that the thickness tE of the negative electrode current collector was changed as shown in Table 1 below, and the restraint conditions were changed as shown in Table 2.

Examples 10 and 11

A secondary battery was produced in the same manner as in Example 1, except that the electrode density of each of the negative electrode mixture layer was changed and the restraint conditions were changed as shown in Table 2.

Comparative Examples 1 and 2

A secondary battery was produced in the same manner as in Example 1, except that the restraint conditions were changed as shown in Table 2.

Comparative Examples 3 and 4

A secondary battery was produced in the same manner as in Example 1, except that the thickness tE of the negative electrode current collector was changed as shown in Table 1, and the restraint conditions were changed as shown in Table 2.

<Measurement of ΔOCV Defect>

By the method shown in each of the examples described above, 100 secondary batteries were produced and the release voltage of the cell after 24 hours from the end of initial charging/discharging was measured. This voltage is defined as V1. In addition, the release voltage of the cell 120 hours after the end of the initial charging/discharging was measured. This voltage is defined as V2. As the determination of the ΔOCV defect, the secondary battery in which $\Delta V = V1 - V2$ was −2 mV or less was determined to be a product with the ΔLOCV defect. According to this determination condition, the number of ΔOCV defects in the 100 secondary batteries was counted.

<Measurement of Protrusion Length of Each Protrusion>

For one of the secondary batteries after the initial charging/discharging produced in each example, the secondary battery was disassembled according to the method described in the first embodiment, and the protrusion lengths A1 and A2 of the first and second protrusions of the negative electrode mixture layer were measured. Here, the first protrusion means a protrusion on one of the pair of long sides. The second protrusion means a protrusion on one of the pair of short sides.

The above-described results are summarized in Tables 1 and 2. In Tables 1 and 2, for the sake of convenience, the first protrusion and the second protrusion of the negative electrode mixture layer are treated as the long side and the short side, respectively. However, this relationship may be reversed. That is, the long side and the short side of the negative electrode mixture layer may be treated as the second protrusion and the first protrusion, respectively. As described in the first embodiment, the secondary battery according to the embodiment has the protrusion extending from the current collector end surface in at least a part of the end portion of the negative electrode mixture layer.

In Table 2, the electrode density refers to the electrode density of the mixture layer on one side of the negative electrode excluding the current collector.

TABLE 1

| Negative electrode active material composition | Thickness tE of negative electrode current collector (mm) | First protrusion (long side) | | | Second protrusion (short side) | | |
|---|---|---|---|---|---|---|---|
| | | Length A1 of protrusion (mm) | Shape of protrusion | Ratio A1/tE | Length A2 of protrusion A2 (mm) | Shape of protrusion | Ratio A2/tE |
| Example 1 $Nb_2TiO_7$ | 0.015 | 0.2 | Both upper and lower corner portions of mixture layer have round shape (FIG. 4) | 13.3 | 0.2 | Both upper and lower corner portions of mixture layer have round shape (FIG. 4) | 13.3 |
| Example 2 $Nb_2TiO_7$ | 0.015 | 0.4 | Both upper and Lower corner portions of mixture layer have round shape (FIG. 4) | 26.7 | 0.4 | Both upper and lower corner portions of mixture layer have round shape (FIG. 4) | 26.7 |
| Example 3 $Nb_2TiO_7$ | 0.015 | 0.8 | Both upper and lower corner portions of mixture layer have round shape (FIG. 4) | 53.3 | 0.8 | Both upper and lower corner portions of mixture layer have round shape (FIG. 4) | 53.3 |
| Example 4 $Nb_2TiO_7$ | 0.015 | 0.5 | Portion is warped toward current collector (FIG. 8) | 33.3 | 0.5 | Portion is warped toward current collector (FIG. 8) | 33.3 |
| Example 5 $Nb_2TiO_7$ | 0.015 | 0.5 | Upper corner portion of mixture layer has round shape (FIG. 5) | 33.3 | 0.5 | Upper corner portion of mixture layer has round shape (FIG. 5) | 33.3 |
| Example 6 $Nb_2TiO_7$ | 0.015 | 0.5 | Lower corner portion of mixture layer has round shape (FIG. 6) | 33.3 | 0.5 | Lower corner portion of mixture layer has round shape (FIG. 6) | 33.3 |
| Example 7 $Nb_2TiO_7$ | 0.015 | 0.1 | Both upper and lower corner portions of mixture layer have round shape (FIG. 4) | 6.7 | 0.1 | Both upper and lower corner portions of mixture layer have round shape (FIG. 4) | 6.7 |
| Example 8 $Nb_2TiO_7$ | 0.010 | 0.95 | Both upper and lower corner portions of mixture layer have round shape (FIG. 4) | 95.0 | 0.95 | Both upper and lower corner portions of mixture layer have round shape (FIG. 4) | 95.0 |

TABLE 1-continued

| | Negative electrode active material composition | Thickness tE of negative electrode current collector (mm) | First protrusion (long side) | | | Second protrusion (short side) | | |
|---|---|---|---|---|---|---|---|---|
| | | | Length A1 of protrusion (mm) | Shape of protrusion | Ratio A1/tE | Length A2 of protrusion A2 (mm) | Shape of protrusion | Ratio A2/tE |
| Example 9 | $Nb_2TiO_7$ | 0.012 | 0.5 | Both upper and lower corner portions of mixture layer have round shape (FIG. 4) | 41.7 | 0.5 | Both upper and lower corner portions of mixture layer have round shape (FIG. 4) | 41.7 |
| Example 10 | $Nb_2TiO_7$ | 0.015 | 0.5 | Both upper and lower corner portions of mixture layer have round shape (FIG. 4) | 33.3 | 0.5 | Both upper and lower corner portions of mixture layer have round shape (FIG. 4) | 33.3 |
| Example 11 | $Nb_2TiO_7$ | 0.015 | 0.5 | Both upper and lower corner portions of mixture layer have round shape (FIG. 4) | 33.3 | 0.5 | Both upper and lower corner portions of mixture layer have round shape (FIG. 4) | 33.3 |
| Comparative example 1 | $Nb_2TiO_7$ | 0.015 | −0.3 | Both upper and lower corner portions of mixture layer have round shape (FIG. 4) | −20.0 | −0.2 | Both upper and lower corner portions of mixture layer have round shape (FIG. 4) | −13.3 |
| Comparative example 2 | $Nb_2TiO_7$ | 0.015 | 1.1 | Both upper and lower corner portions of mixture layer have round shape (FIG. 4) | 73.3 | 1.2 | Both upper and lower corner portions of mixture layer have round shape (FIG. 4) | 80.0 |
| Comparative example 3 | $Nb_2TiO_7$ | 0.007 | 0.9 | Both upper and lower corner portions of mixture layer have round shape (FIG. 4) | 128.6 | 0.8 | Both upper and lower corner portions of mixture layer have round shape (FIG. 4) | 114.3 |
| Comparative example 4 | $Nb_2TiO_7$ | 0.020 | 0.1 | Both upper and lower corner portions of mixture layer have round shape (FIG. 4) | 5.0 | 0.1 | Both upper and lower corner portions of mixture layer have round shape (FIG. 4) | 5.0 |

TABLE 2

| | Electrode density (g/cm$^3$) | Thickness tB of secondary battery before initial charging (μm) | Thickness tC of negative electrode mixture layer before initial charging (μm) | Thickness coefficient x (%) | Restrained thickness (tB + tCx) [μm] | Number of ΔOCV defects in 100 secondary batteries |
|---|---|---|---|---|---|---|
| Example 1 | 2.6 | 1740 | 580 | 19.0 | 1850 | 1 |
| Example 2 | 2.6 | 1740 | 580 | 10.3 | 1800 | 0 |
| Example 3 | 2.6 | 1740 | 580 | 1.7 | 1750 | 0 |
| Example 4 | 2.8 | 1690 | 530 | 1.9 | 1700 | 0 |
| Example 5 | 2.8 | 1690 | 530 | 11.3 | 1750 | 1 |
| Example 6 | 2.8 | 1690 | 530 | 20.8 | 1800 | 0 |
| Example 7 | 2.6 | 1710 | 580 | 24.1 | 1850 | 2 |
| Example 8 | 2.6 | 1693 | 580 | 1.2 | 1700 | 2 |
| Example 9 | 2.6 | 1710 | 580 | 6.9 | 1750 | 2 |
| Example 10 | 2.3 | 1810 | 650 | 13.8 | 1900 | 2 |
| Example 11 | 2.9 | 1675 | 515 | 14.6 | 1750 | 2 |
| Comparative example 1 | 2.3 | 1810 | 650 | 44.6 | 2100 | 4 |
| Comparative example 2 | 2.9 | 1675 | 515 | 4.9 | 1700 | 4 |
| Comparative example 3 | 2.6 | 1655 | 580 | 16.4 | 1750 | 3 |
| Comparative example 4 | 2.6 | 1790 | 580 | 10.3 | 1850 | 3 |

From Tables 1 and 2, for example, the following can be seen.

As shown in Examples 1 to 11, when the negative electrode current collector had a thickness of 8 μm or more and 18 μm or less and the negative electrode mixture layer had the first protrusion with a length of 0 mm to 1 mm, the frequency of the ΔOCV defect was low.

In Comparative Example 1, the electrode density was a relatively low numerical value of 2.3 g/cm$^3$, and the expansion width (expansion margin) in the thickness direction was excessively present at the time point before the initial charging. As a result, since the mixture layer was difficult to expand in the in-plane direction, no protrusion was formed on the long side and the short side. In Comparative Example 1, an internal short circuit in the vicinity of the end surface of the negative electrode current collector was hardly suppressed, so that the number of ΔOCV defects was large.

In Comparative Example 2, the electrode density was as high as 2.9 g/cm³, and the expansion width (expansion margin) in the thickness direction was excessively small at the time point before the initial charging. As a result, the expansion in the in-plane direction excessively progressed, and the lengths of the protrusions of the mixture layer exceeded 1.0 mm on both the long side and the short side. In Comparative Example 2, the number of ΔOCV defects was large. For this reason, it is considered that the mixture layer tended to be broken in the vicinity of the end surface of the negative electrode current collector.

As shown in Comparative Example 3, it is considered that when the thickness tE of the negative electrode current collector was less than 8 μm, the negative electrode current collector was easily broken, and the number of LOCV defects was large due to the release of the broken current collector into the electrolytic solution.

In Comparative Example 4, the thickness of the current collector exceeded 18 μm. Therefore, it is considered that the expansion in the in-plane direction was not promoted even when the constant dimension restraint was performed in which the expansion width in the thickness direction (margin of expansion) was controlled to be, for example, approximately the same as that in Example 2. In Comparative Example 4, it is considered that since the exposed portion of the end surface of the current collector was large, the internal short circuit increased, and the number of ΔOCV defects was large.

As shown in Example 4, by controlling the expansion width (the margin of expansion) in the thickness direction to be small as a restraint condition in a state where the electrode density is increased to some extent, the mixture layer expanded in the in-plane direction can be warped toward the current collector.

In addition, as shown in Examples 5 and 6, by increasing or decreasing the thickness coefficient in a state where the electrode density is relatively increased, a corner portion (upper corner portion) intersecting the front surface of the negative electrode mixture layer or a corner portion (lower corner portion) intersecting the back surface of the negative electrode mixture layer can have a round shape.

In Examples 1 to 6 in which the electrode density was in the range of 2.4 g/cm³ to 2.8 g/cm³ and the ratio A1/tE of the protrusion length A1 of the first protrusion to the thickness tE of the negative electrode current collector was in the range of 10 to 90, the frequency of the ΔOCV defect was very low.

According to at least one embodiment and one Example described above, a secondary battery is provided. The secondary battery includes a negative electrode, a positive electrode, and an electrolyte. The negative electrode includes a negative electrode current collector and a negative electrode mixture layer stacked on the negative electrode current collector and having a front surface and a back surface. The negative electrode current collector has a thickness of 8 μm or more and 18 μm or less, and includes a first current collector end surface extending along a stacking direction in which the negative electrode mixture layer is stacked on the negative electrode current collector. The negative electrode mixture layer contains a niobium-titanium composite oxide as a negative electrode active material, and includes a first protrusion protruding from the first current collector end surface along a first direction orthogonal to the stacking direction. A protrusion length A1 of the first protrusion satisfies 0 mm<A1≤1.0 mm. According to the secondary battery, the frequency of a defect caused by self-discharge can be reduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
a negative electrode comprising a negative electrode current collector and a negative electrode mixture layer stacked on the negative electrode current collector and having a front surface and a back surface;
a positive electrode; and
an electrolyte, wherein
a thickness of the negative electrode current collector is in a range of 8 μm to 18 μm, and the negative electrode current collector comprises a first current collector end surface extending along a stacking direction in which the negative electrode mixture layer is stacked on the negative electrode current collector,
the negative electrode mixture layer comprises a niobium-titanium composite oxide as a negative electrode active material, and a first protrusion protruding from the first current collector end surface along a first direction orthogonal to the stacking direction,
a protrusion length A1 of the first protrusion satisfies 0 mm<A1≤1.0 mm, and
the first protrusion comprises a corner portion having a round shape in a cross section along a thickness direction of the first protrusion.

2. The secondary battery according to claim 1, wherein
both the negative electrode current collector and the negative electrode mixture layer have a rectangular shape, and
the first current collector end surface is one of a long side end surface and a short side end surface of the negative electrode current collector, and
the negative electrode current collector further comprises a second current collector end surface which is the other of the long side end surface and the short side end surface of the negative electrode current collector, and
the negative electrode mixture layer comprises a second protrusion protruding from the second current collector end surface along a second direction orthogonal to the stacking direction, and
a protrusion length A2 of the second protrusion satisfies 0 mm<A2≤1.0 mm.

3. The secondary battery according to claim 1, wherein a ratio Al/tE of the protrusion length A1 of the first protrusion to a thickness tE of the negative electrode current collector is in a range of 5 to 100.

4. The secondary battery according to claim 1, wherein an electrode density of the negative electrode mixture layer is in a range of 2.1 g/cm3 to 3.0 g/cm3.

5. A battery pack comprising the secondary battery according to claim 1.

6. The battery pack according to claim 5, further comprising an external power distribution terminal and a protective circuit.

7. The battery pack according to claim 5, comprising a plurality of the secondary battery, wherein the secondary batteries are electrically connected in series, in parallel, or in combination of series and parallel.

8. A vehicle comprising the battery pack according to claim 5.

9. The vehicle according to claim 8, comprising a mechanism configured to convert kinetic energy of the vehicle into regenerative energy.

10. The secondary battery according to claim 1, wherein the corner portion having the round shape is located at at least one of a corner portion where the front surface of the negative electrode mixture layer intersects an end surface of the negative electrode mixture layer or a corner portion where the back surface of the negative electrode mixture layer intersects the end surface of the negative electrode mixture layer.

* * * * *